(12) United States Patent
Chen et al.

(10) Patent No.: US 11,625,169 B2
(45) Date of Patent: Apr. 11, 2023

(54) EFFICIENT TOKEN MANAGEMENT IN A STORAGE SYSTEM

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/938,272

(22) Filed: Jul. 24, 2020

(65) Prior Publication Data

US 2022/0027059 A1    Jan. 27, 2022

(51) Int. Cl.
*G06F 3/06* (2006.01)
*G06F 11/14* (2006.01)

(52) U.S. Cl.
CPC .......... *G06F 3/0619* (2013.01); *G06F 3/0653* (2013.01); *G06F 3/0659* (2013.01); *G06F 3/0683* (2013.01); *G06F 11/1435* (2013.01); *G06F 11/1474* (2013.01); *G06F 2201/84* (2013.01)

(58) Field of Classification Search
CPC .. G06F 3/0619; G06F 3/0659; G06F 11/1474; G06F 3/0653; G06F 11/1435; G06F 3/0683; G06F 2201/84; G06F 3/0614; G06F 3/0689; G06F 3/0641; G06F 3/0608; G06F 3/067; G06F 3/065
USPC .................................................. 711/162, 161
See application file for complete search history.

(56) References Cited

U.S. PATENT DOCUMENTS

| | | | |
|---|---|---|---|
| 6,141,743 A | 10/2000 | Strongin | |
| 8,954,383 B1 | 2/2015 | Vempati et al. | |
| 9,003,227 B1 | 4/2015 | Patel et al. | |
| 9,104,675 B1 | 8/2015 | Clark et al. | |

(Continued)

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.

(Continued)

*Primary Examiner* — David Yi
*Assistant Examiner* — Zubair Ahmed
(74) *Attorney, Agent, or Firm* — Ryan, Mason & Lewis, LLP

(57) ABSTRACT

At least one processing device receives a create-token command from a host device. Responsive to receipt of the create-token command, the processing device creates the token, generates an in-memory snapshot of data in one or more logical address ranges of one or more source storage volumes, associates the in-memory snapshot with the token, and provides the token to the host device. The processing device receives a write-via token command from the host device, the write-via-token command specifying the token and one or more logical address ranges of one or more target storage volumes. Responsive to receipt of the write-via-token command, the processing device determines whether or not differential metadata of the storage system includes one or more entries for the one or more logical address ranges of the one or more source storage volumes, and controls execution of the write-via-token command based at least in part on the determination.

20 Claims, 16 Drawing Sheets

(56) References Cited

U.S. PATENT DOCUMENTS

| | | | |
|---|---|---|---|
| 9,778,996 | B1 | 10/2017 | Bono et al. |
| 10,210,048 | B2 | 2/2019 | Sancheti |
| 10,474,367 | B1 | 11/2019 | Mallick et al. |
| 2004/0054644 | A1* | 3/2004 | Ganesh .............. G06F 16/2358 |
| 2012/0072662 | A1* | 3/2012 | Jess ...................... G06F 3/0685 |
| | | | 711/E12.001 |
| 2012/0084521 | A1* | 4/2012 | Fukui ................. G06F 11/1438 |
| | | | 711/162 |
| 2014/0059300 | A1* | 2/2014 | Olin ..................... G06F 3/0619 |
| | | | 711/E12.017 |
| 2017/0289290 | A1* | 10/2017 | Bhagwat ............ H04L 67/2809 |
| 2020/0133497 | A1 | 4/2020 | Meiri et al. |
| 2020/0133541 | A1 | 4/2020 | Kleiner et al. |

OTHER PUBLICATIONS

NVM Express, "NVM Express, Revision 1.3," NVM Express, May 1, 2017, 282 pages.
Commvault, "Storage Policy (Snapshot)" https://documentation.commvault.com/commvault/v11/article?p=60105_1.htm, Sep. 12, 2019, 3 pages.
Oracle, "Managing Snapshots," https://docs.cloud.oracle.com/en-us/iaas/Content/File/Tasks/managingsnapshots.htm, 2020, 3 pages.
R. Shanava, "ODX with FlashArray: An Engineer's Perspective," https://blog.purestorage.com/odx-flasharray-engineers-perspective/, Aug. 8, 2017, 9 pages.
"Offloaded Data Transfer," https://docs.microsoft.com/en-us/windows-hardware/drivers/storage/offloaded-data-transfer, Oct. 4, 2019, 9 pages.
U.S. Appl. No. 16/260,660, filed Jan. 29, 2019, and entitled "System and Method for Aggregating Metadata Changes in a Storage System.".
U.S. Appl. No. 16/861,986 filed in the name of Vladimir Shveidel et al. on Apr. 29, 2020, and entitled "Lockless Metadata Binary Tree Access.".
U.S. Appl. No. 16/862,733 filed in the name of Alexander S. Mathews et al. on Apr. 30, 2020, and entitled "Finding Storage Objects of a Snapshot Group Pointing to a Logical Page in a Logical Address Space of a Storage System."
U.S. Appl. No. 16/862,735 filed in the name of Dixitkumar Vishnubhai Patel et al. on Apr. 30, 2020, and entitled "Mapping Virtual Block Addresses to Portions of a Logical Address Space that Point to the Virtual Block Addresses."
U.S. Appl. No. 16/862,740 filed in the name of Rohit K. Chawla et al. on Apr. 30, 2020, and entitled "Generating Recommendations for Initiating Recovery of a Fault Domain Representing Logical Address Space of a Storage System."
U.S. Appl. No. 16/863,433 filed in the name of Sorin Faibish et al. on Apr. 30, 2020, and entitled "Cache Retention for Inline Deduplication Based on Number of Physical Blocks with Common Fingerprints Among Multiple Cache Entries."
U.S. Appl. No. 16/879,459 filed in the name of Yousheng Liu et al. on May 20, 2020, and entitled "Reusing Overwritten Portion of Write Buffer of a Storage System."
U.S. Appl. No. 16/888,668 filed in the name of Kundan Kumar et al. on May 30, 2020, and entitled "Selective Snapshot Creation Using Source Tagging of Input-Output Operations.".
U.S. Appl. No. 16/897,388 filed in the name of Alex Soukhman et al. on Jun. 10, 2020, and entitled "Garbage Collection in a Storage System at Sub-Virtual Block Granularity Level."
U.S. Appl. No. 16/907,560 filed in the name of Vamsi K. Vankamamidi et al. on Jun. 22, 2020, and entitled "Regulating Storage Device Rebuild Rate in a Storage System."
U.S. Appl. No. 16/916,219 filed in the name of Vladimir Kleiner et al. on Jun. 30, 2020, and entitled "Application Execution Path Tracing for Inline Performance Analysis."
U.S. Appl. No. 16/916,621 filed in the name of Dixitkumar Vishnubhai Patel et al. on Jun. 30, 2020, and entitled "Reconstruction of Logical Pages in a Storage System."
U.S. Appl. No. 16/916,763 filed in the name of Dixitkumar Vishnubhai Patel et al. on Jun. 30, 2020, and entitled "Reconstruction of Links between Logical Pages in a Storage System."
U.S. Appl. No. 16/917,090 filed in the name of Dixitkumar Vishnubhai Patel et al. on Jun. 30, 2020, and entitled "Reconstruction of Links to Orphaned Logical Pages in a Storage System."

* cited by examiner

EFFICIENT TOKEN MANAGEMENT IN A STORAGE SYSTEM

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operations, such as read and write operations, for delivery to the storage systems. Storage controllers of the storage systems service such IO operations. Some storage systems use a logical address space, where logical page addresses in the logical address space map to physical page addresses on storage devices of the storage systems. The use of a logical address space facilitates various functionality, including implementation of deduplication in order to ensure that the same data is not repeatedly stored in a duplicative manner that consumes excessive storage capacity. Many storage systems are also illustratively configured to execute multiple-command token-based data transfers, such as those implemented using Microsoft Offloaded Data Transfer (ODX) commands. Techniques are needed for efficiently managing the corresponding tokens in storage systems that support token-based data transfers.

SUMMARY

Illustrative embodiments of the present disclosure provide techniques for efficient token management in a storage system. For example, such embodiments can provide particularly efficient management of tokens associated with ODX commands and other types of commands used in implementing token-based data transfers. In some embodiments, efficient token management is provided in a manner that advantageously avoids the need to persist token-related snapshots and their associated metadata in back-end storage devices while also avoiding adverse performance impacts on source storage volumes. For example, such embodiments are illustratively configured to respond quickly to create-token commands, and to protect the data represented by the tokens, with a lightweight metadata footprint and minimal impact on the source volumes.

In one embodiment, an apparatus comprises at least one processing device comprising a processor coupled to a memory. The at least one processing device is configured to receive a create-token command from a host device, the create-token command specifying one or more logical address ranges of one or more source storage volumes of a storage system. Responsive to receipt of the create-token command, the at least one processing device creates the token, generates an in-memory snapshot of data in the one or more logical address ranges of the one or more source storage volumes, associates the in-memory snapshot with the token, and provides the token to the host device. The at least one processing device receives a write-via token command from the host device, the write-via-token command specifying the token and one or more logical address ranges of one or more target storage volumes. Responsive to receipt of the write-via-token command, the at least one processing device determines whether or not differential metadata of the storage system includes one or more entries for the one or more logical address ranges of the one or more source storage volumes, and controls execution of the write-via-token command based at least in part on the determination.

The at least one processing device in some embodiments comprises a storage controller of the storage system, such as a distributed storage controller distributed across multiple storage nodes in the case of a distributed storage system. A wide variety of other arrangements of one or more processing devices may be used.

In some embodiments, the one or more target storage volumes are part of the same storage system that includes the one or more source storage volumes. Alternatively, the one or more target storage volumes may be on a different storage system.

The create-token command and the write-via-token command in some embodiments comprise respective ODX commands, although other types of commands, including non-standard or custom commands, can be used.

In some embodiments, the in-memory snapshot is not subsequently persisted in one or more back-end storage devices of the storage system. Alternatively, the in-memory snapshot can be persisted, but designated for use only with ODX write-via-token commands or other types of write-via-token commands.

The differential metadata of the storage system illustratively comprises at least one metadata delta log comprising one or more delta log buffers each comprising one or more delta log records. Other types and arrangements of differential metadata can be used in other embodiments.

In some embodiments, the storage system implements an in-memory transactional cache in which IO operations and storage system management operations are persisted as part of a chronological journal. In such an embodiment, generating the in-memory snapshot of data in the one or more logical address ranges of the one or more source storage volumes illustratively comprises generating the in-memory snapshot within the in-memory transactional cache.

In some embodiments, responsive to receipt of a write operation directed to at least one logical address within the one or more logical address ranges of the one or more source storage volumes for which the token was created, a corresponding entry is generated in a metadata delta log of the differential metadata.

Controlling execution of the write-via-token command based at least in part on the determination in some embodiments more particularly comprises, responsive to the determination being affirmative, utilizing metadata from the one or more entries in the execution of the write-via-token command.

For example, in some embodiments, determining if differential metadata of the storage system includes one or more entries for the one or more logical address ranges of the one or more source storage volumes comprises initiating an operation for copying of metadata for the one or more logical address ranges of the one or more source storage volumes from the in-memory snapshot to the one or more target storage volumes, and determining in conjunction with the copying whether or not at least a portion of the metadata is in one or more metadata delta logs of the differential metadata. In a given such embodiment, controlling execution of the write-via-token command based at least in part on the determination illustratively comprises, responsive to at least a portion of the metadata being in one or more metadata delta logs of the differential metadata, utilizing that portion of the metadata in the one or more metadata delta logs in the copying, and additionally copying remaining portions of the metadata from the in-memory snapshot to the one or more target storage volumes.

In some embodiments, responsive to the transactional cache reaching a designated fullness level, the in-memory snapshot is destaged from the transactional cache to one or more back-end storage devices of the storage system and designated for use only in conjunction with execution of one or more write-via-token commands.

Alternatively, responsive to the transactional cache reaching a designated fullness level, the in-memory snapshot is deleted and the token is invalidated.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
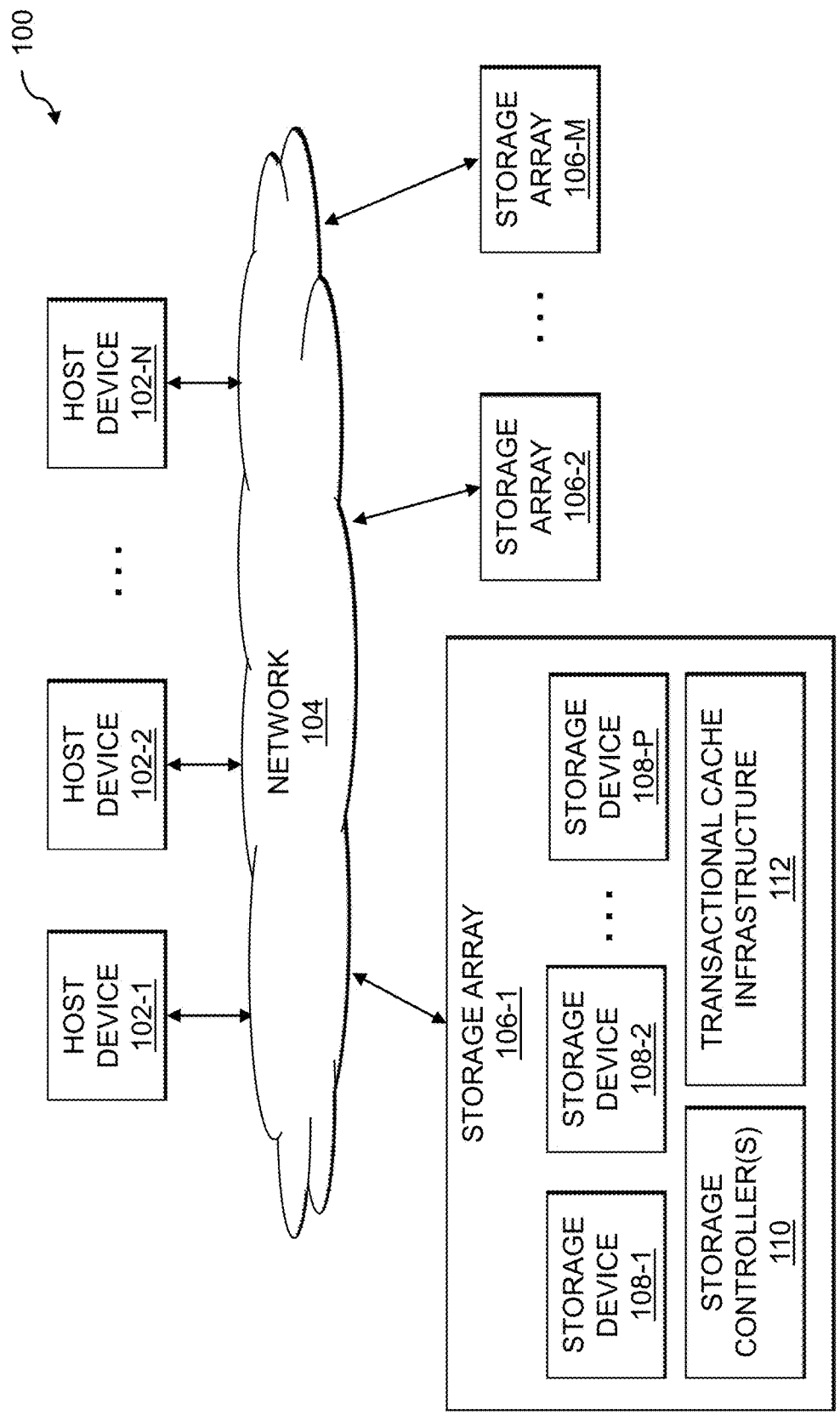
FIG. 1 is a block diagram of an information processing system including a storage array configured for efficient token management in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106).

The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on at least one of the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is illustratively shared by the host devices 102, and may therefore be viewed as an example of a shared storage system. In embodiments where there is only a single host device 102, the host device 102 may be configured to have exclusive use of the storage system comprising storage array 106-1. The other storage arrays 106 of system 100 are assumed to be configured in a manner similar to that described above for storage array 106-1, and such storage arrays 106 may be viewed as comprising respective individual storage systems, or as collectively comprising one or more storage systems each with multiple storage arrays.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an TO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage arrays 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

In some embodiments, the one or more storage controllers 110 are each configured to receive queries for finding storage objects of the storage array 106-1 (e.g., more generally, storage objects of a storage system, which may include a storage cluster including the storage array 106-1 and one or more other ones of the storage arrays 106-2 through 106-M) that are associated with a particular snapshot family or snapshot group, and which point to a particular logical page in a logical address space of the storage array 106-1. To do so, the one or more storage controllers 110 each build or otherwise generate a tree structure that characterizes relationships between a plurality of storage objects in the storage array 106-1. The tree structure is assumed to comprise a plurality of logical page nodes representing the plurality of storage objects. Each of the plurality of logical page nodes specifies a logical page address in the logical address space of the storage array 106-1, and includes various metadata such as an array of pointers to one or more other logical page addresses in the logical address space, a snapshot group identifier for a snapshot group in the storage array 106-1, and a logical extent offset in the logical address space. The generated tree structure may be viewed as a two-level data structure, where the first level corresponds to snapshot group identifiers and the second level is a hash of binary trees associated with respective ones of the snapshot group identifiers.

Additionally or alternatively, the one or more storage controllers 110 may each be further configured to receive queries (e.g., from the host devices 102, from a file system check tool scanning the storage array 106-1, etc.), where a given query comprises a given logical page address, a given snapshot group identifier, and a given logical extent offset. The given query may be viewed as a request to find whether a given snapshot group associated with the given snapshot group identifier has a given logical page node (e.g., representing a given storage object) at the given logical extent offset and, if so, a request to find other logical page nodes (e.g., representing other storage objects) with the given snapshot group identifier and the given logical extent offset that comprise a pointer to the given logical page address in their associated arrays of pointers. The one or more storage controllers 110 each traverse the generated tree structure to do so, and return a response to the query that specifies the given logical page and the identified other ones of the plurality of logical pages. In this way, the one or more storage controllers 110 are each able to find all storage objects within a snapshot group or family that point to the given logical page address.

In some embodiments, the logical address space is organized as a B-tree (an example of which will be described in further detail below with respect to FIGS. 4A and 4B), where the B-tree includes multiple levels including a leaf logical page level and one or more additional logical page levels above the leaf logical page level (e.g., a middle page level comprising middle pages associated with respective subsets of leaf pages in the leaf page level, a top page level comprising top pages associated with respective subsets of the middle page in the middle page level, etc.). The generated tree structure may comprise a hash of binary trees that arrange the plurality of logical page nodes into the leaf logical page level and the one or more additional logical page levels above the leaf logical page level. A given one of the top pages may represent an n*m sized portion of the logical address space that references n middle pages in the middle page level each representing an m sized portion of the logical address space, a given one of the middle pages referencing n leaf pages in the leaf page level each representing an m/n sized portion of the logical address space. In some embodiments, n is 512 and m is one gigabyte (GB), although other values can be used in other embodiments. In some embodiments, the plurality of logical page nodes further specify namespace addresses associated with respective storage objects in the storage system.

The storage array 106-1 implements a transactional cache infrastructure 112. Although not explicitly shown in FIG. 1 for clarity of illustration, it is assumed in some embodiments that other ones of the storage arrays 106-2 through 106-M implement respective additional instances of a transactional cache infrastructure, as well as respective sets of storage devices and storage controllers in a manner similar to that described herein with respect to storage array 106-1. Further, although shown in FIG. 1 as being external to the storage controllers 110 of storage array 106-1, in other embodiments the transactional cache infrastructure 112 may be implemented at least partially within one or more of the storage controllers 110. For example, at least one of the storage controllers 110 may be implemented as a virtual storage controller running on an embedded hypervisor of the storage array 106-1. The transactional cache infrastructure 112 may be part of such a virtual storage controller, or may be run separate from the virtual storage controller on such an embedded hypervisor. Various other arrangements are possible, including where at least a portion of the functionality of the transactional cache infrastructure 112 is implemented external to the storage array 106-1 (e.g., on one or more of the host devices 102, on a separate server, on a cloud computing infrastructure, etc.).

Figure 2:
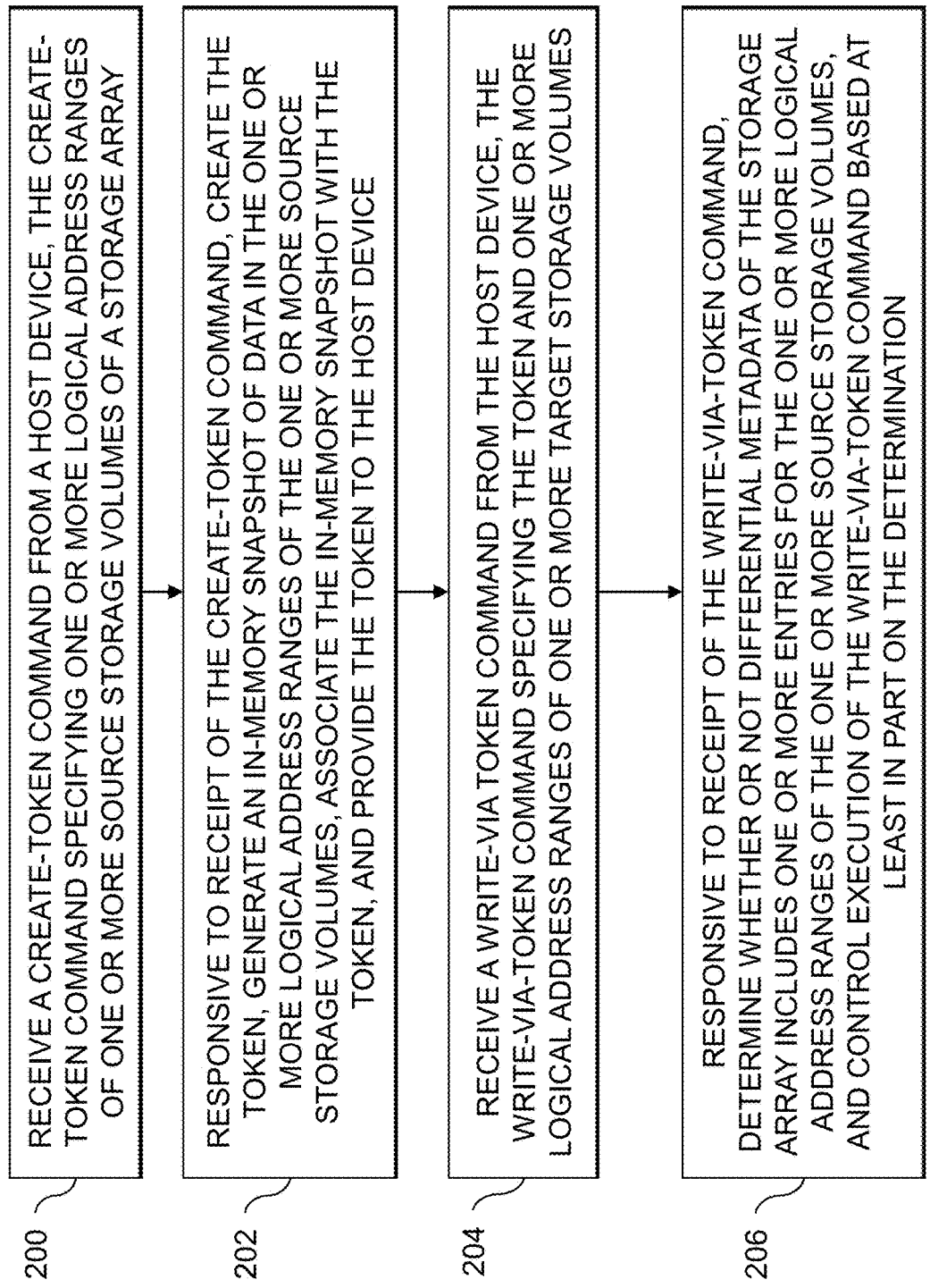
FIG. 2 is a flow diagram of an exemplary process for efficient token management in an illustrative embodiment.
Figure 9:
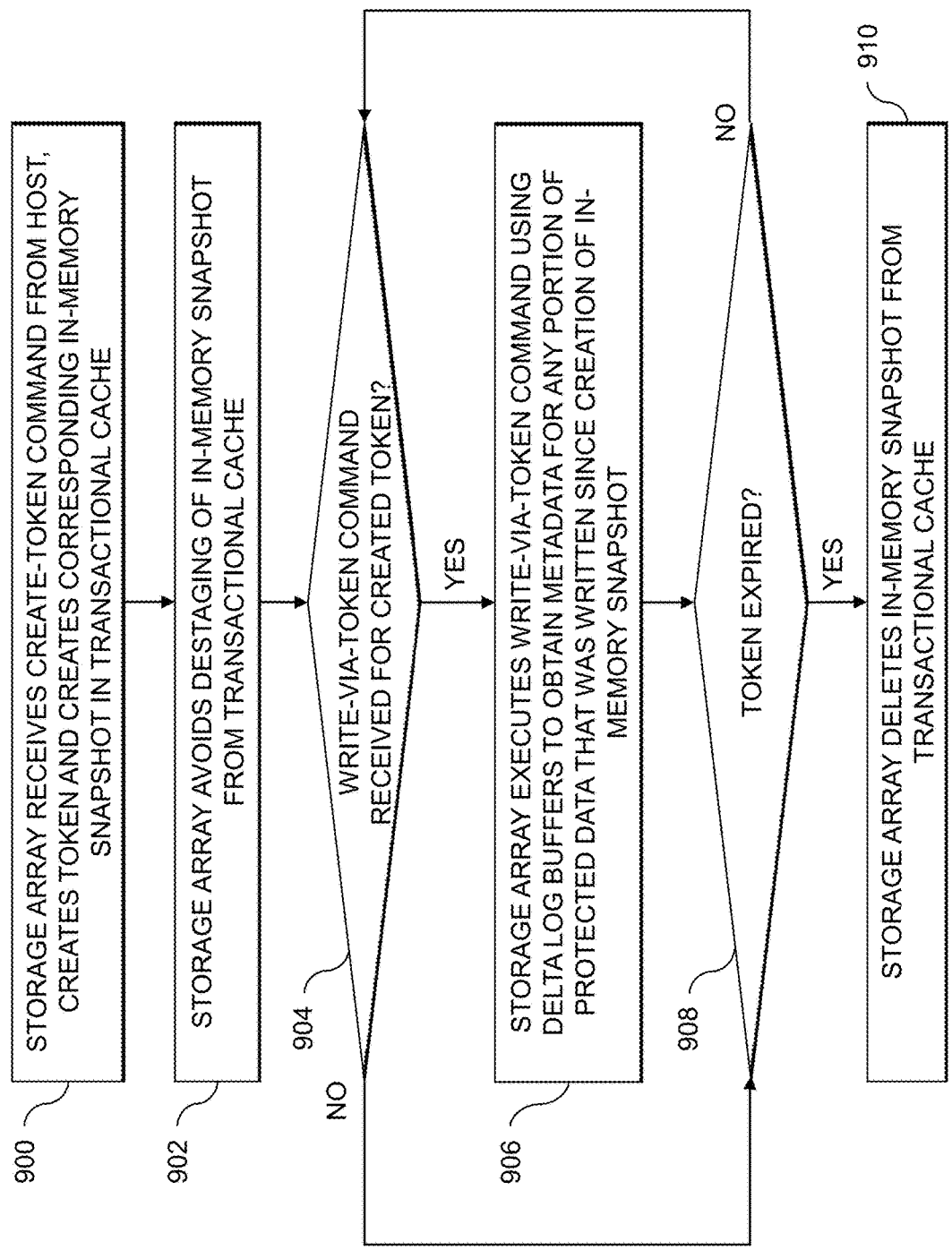
FIG. 9 is a flow diagram of another exemplary process for efficient token management in an illustrative embodiment.

The transactional cache infrastructure 112 illustratively comprises at least one transactional cache and associated control logic for implementing at least portions of efficient token management algorithms such as those described herein in conjunction with the flow diagrams of FIGS. 2 and 9. In one possible example of a given transactional cache of the transactional cache infrastructure 112, IO operations as well as management operations are first persisted in the cache as a transaction in a chronological journal, and in the background drained from the cache and persisted to back-end storage devices such as storage devices 108. Terms such as "transactional cache" and "transactional cache infrastructure" as used herein are intended to be broadly construed, and should not be viewed as being limited to the arrangements of these and other illustrative embodiments.

The storage array 106-1 is further configured to implement techniques for efficient token management in support of token-based transfers, as will now be described in further detail. For example, some embodiments can provide particularly efficient management of tokens associated with ODX commands and other types of commands used in implementing token-based data transfers.

Efficient token management is illustratively provided in a manner that advantageously avoids the need to persist token-related snapshots and their associated metadata in storage devices 108 while also avoiding adverse performance impacts on source storage volumes. For example, such embodiments are illustratively configured to respond quickly to create-token commands, and to protect the data represented by the tokens, with a lightweight metadata footprint and minimal impact on the source volumes.

Accordingly, the host devices 102 and storage arrays 106 are further configured to perform additional operations associated with token-based data transfer using ODX commands or types of token-based data transfer commands.

A given token-based data transfer initiated by a given one of the host devices 102 with a given one of the storage arrays 106 is assumed to comprise at least two distinct commands, including a first command specifying at least one source extent of at least one source storage volume, and a second command identifying the token and directing that the at least one source extent of the at least one source storage volume be copied to at least one target extent of at least one target storage volume. Such source and target extents are more generally referred to herein as "logical address ranges" of the source and target storage volumes.

It is possible that multiple ones of the host devices 102 and/or multiple ones of the storage arrays 106 may be involved in a given token-based data transfer in some embodiments. For example, one of the host devices 102 can provide a token to another one of the host devices 102 in order to allow the latter host device to initiate a write-via-token operation with the storage array that issued the token.

Examples of token-based data transfer commands include the previously-mentioned ODX commands, which illustratively include respective instances of create-token and write-via-token commands as the above-noted first and second commands associated with the given token-based data transfer, although numerous other types and arrangements of token-based data transfer commands can be used in other embodiments.

Terms such as "command" as used herein are therefore intended to be broadly construed, and a given such command can include multiple sub-commands. References herein to "create-token" commands and "write-via-token" commands are also intended to be broadly construed, and should not be viewed as being limited to ODX implementations of such commands, or any other particular command format.

In some embodiments, a token is generated by the storage array 106-1 responsive to receipt of a create-token command from the host device 102-1 and returned to the host device 102-1. The token may be generated by the storage array 106-1 based at least in part on host application block information received from the host device in conjunction with the create-token command. For example, the token is illustratively implemented as a sufficiently unique identifier of the corresponding data transfer within system 100, such as a 128-bit universally unique identifier (UUID), possibly generated as a cryptographic hash of information that includes the identity of the storage array 106-1 issuing the token, identifiers of the one or more source storage volumes that are subject to the token-based data transfer, source extent information, and a time when the create-token command was received, or various subsets thereof. Other embodiments can generate the token as a counter value or a random or pseudorandom number. Combinations of these and other arrangements can also be used in generating the token.

The host device 102-1 illustratively incorporates the token received from the storage array 106-1 into the second command of the token-based data transfer, also referred to herein as the write-via-token command, that it sends to the storage array 106-1.

In a given such token-based data transfer arrangement, the storage array 106-1 preserves the corresponding data at the time of or otherwise in conjunction with the creation of the token. The token illustratively corresponds to the data, and not the one or more logical address ranges, and the preserved data can be later accessed via the token, using the above-noted write-via-token command. It is generally desirable in such an arrangement for the host device 106-1 to be able to copy the data as quickly as possible to the one or more target storage volumes in response to the receipt of the write-via-token command from the host device 102-1. However, it can be difficult under conventional practice to carry out such operations with a high level of efficiency. For example, persisting snapshots and associated metadata in back-end storage in conjunction with creation of a token and subsequently retrieving those persisted snapshots and associated data from back-end storage upon receipt of a write-via-token command create undue delay while also consuming computation and storage resources of the system, thereby potentially undermining overall system performance. As indicated above, illustrative embodiments herein avoid such difficulties, and provide a solution that responds quickly to the create-token command, protects the data represented by the token, has a light metadata footprint, and has minimal impact on the source volume(s).

Examples of efficient token management in illustrative embodiments will now be described in more detail using host device 102-1 and storage array 106-1, although it is to be understood that other host devices 102 and storage arrays 106 are similarly configured to perform token-based data transfer.

In operation, the host device 102-1 generates a create-token command and sends it to the storage array 106-1. The create-token command specifies one or more logical address ranges of one or more source storage volumes of storage array 106-1. The storage array 106-1 receives the create-token command from the host device 102-1, and responsive to receipt of the create-token command, creates the token, generates an in-memory snapshot of data in the one or more logical address ranges of the one or more source storage volumes, associates the in-memory snapshot with the token, and provides the token to the host device 102-1. The host device 102-1 subsequently generates a write-via-token command and sends it to the storage array 106-1. The write-via-token command specifies the token and one or more logical address ranges of one or more target storage volumes. The one or more target storage volumes of the write-via-token command may be on the same storage array 106-1 as the one or more source storage volumes, or may be on a different one of the storage arrays 106. The storage array 106-1 receives the write-via token command from the host device 102-1, and responsive to receipt of the write-via-token command, determines whether or not differential metadata of the storage array 106-1 includes one or more entries for the one or more logical address ranges of the one or more source storage volumes, and controls execution of the write-via-token command based at least in part on the determination. The storage-side portions of the above-described operations are illustratively performed by or under the control of at least one of the one or more storage controllers 110 of the storage array 106-1, utilizing the transactional cache infrastructure 112.

As indicated previously, the create-token command and the write-via-token command can comprise, for example, respective ODX commands, although other types of commands can be used in other embodiments.

In some embodiments, the in-memory snapshot is not subsequently persisted in one or more of the storage devices 108 of the storage array 106-1. Such storage devices 108 are examples of what are also referred to herein as "back-end storage devices." Instead, the in-memory snapshot remains in a transactional cache for as long as possible, as described in more detail below, in order to avoid the substantial inefficiencies that would otherwise be associated with persisting the in-memory snapshot to one or more of the storage devices 108.

The differential metadata of the storage array 106-1 illustratively comprises at least one metadata delta log comprising one or more delta log buffers each comprising one or more delta log records. Responsive to receipt of a write operation directed to at least one logical address within the one or more logical address ranges of the one or more source storage volumes for which the token was created, a corresponding entry is generated in a metadata delta log of the differential metadata. A more detailed example of such a metadata delta log will be described below in conjunction with FIG. 7, although other types of metadata delta logs, or more generally "differential metadata" may be used, as the latter term as used herein is intended to be broadly construed and is not limited to the FIG. 7 arrangement or any other particular metadata delta log arrangements.

In some embodiments, the storage array 106-1 implements within its transactional cache infrastructure an in-memory transactional cache in which IO operations as well as management operations of the storage array 106-1 are collectively persisted as part of a chronological journal of such operations.

In generating the in-memory snapshot of data in the one or more logical address ranges of the one or more source storage volumes, the storage array 106-1 illustratively generates the in-memory snapshot within the above-noted in-memory transactional cache.

Controlling execution of the write-via-token command based at least in part on the above-noted determination relating to differential metadata more particularly comprises, responsive to the determination being affirmative, utilizing metadata from the one or more entries in the execution of the write-via-token command.

In some embodiments, determining if differential metadata of the storage array 106-1 includes one or more entries for the one or more logical address ranges of the one or more source storage volumes comprises initiating an operation for copying of metadata for the one or more logical address ranges of the one or more source storage volumes from the in-memory snapshot to the one or more target storage volumes, and determining in conjunction with the copying whether or not at least a portion of the metadata is in one or more metadata delta logs of the differential metadata.

Controlling execution of the write-via-token command based at least in part on the determination in such an embodiment illustratively comprises, responsive to at least a portion of the metadata being in one or more metadata delta logs of the differential metadata, utilizing that portion of the metadata in the one or more metadata delta logs in the copying, and copying remaining portions of the metadata from the in-memory snapshot to the one or more target storage volumes.

In some embodiments, responsive to the transactional cache reaching a designated fullness level, the in-memory snapshot is destaged from the transactional cache to one or more back-end storage devices of the storage array 106-1 and designated for use only in conjunction with execution of one or more write-via-token commands.

Alternatively, responsive to the transactional cache reaching a designated fullness level, the in-memory snapshot is deleted and the token is invalidated.

An example algorithm that is illustratively implemented by host device 102-1 and a given one of the one or more storage controllers 110 of the storage array 106-1, utilizing a transactional cache and associated control logic of the transactional cache infrastructure 112, includes the steps listed below. These steps are described with reference to copying from a single source logical address range in a single source storage volume to a single target logical address range in a single target storage volume, but the algorithm can be expanded in a straightforward manner to multiple ranges in multiple volumes.

1. Host device 102-1 sends a create-token command to storage array 106-1, specifying a source logical address range in a source storage volume.

2. Storage array 106-1 creates a memory-only range-specific snapshot for this source storage volume. The snapshot is implemented in the transactional cache of the transactional cache infrastructure 112, and is ideally never destaged to back-end storage devices 108. Such a snapshot is an example of what is more generally referred to herein as an "in-memory" snapshot. The snapshot is not accessible for normal read and/or write commands, and protects only the specified source logical address range. Any write operation directed to that range in the source storage volume results in creation of a snapshot leaf to a virtual metadata delta log that copies the "old" leaf mapping metadata to the snapshot. Write operations outside the range are allowed to pass uninterrupted.

3. Host device 102-1 sends a write-via-token command, specifying a target logical address range in a target storage volume.

4. Storage array 106-1 applies a mapping metadata copy operation from the snapshot corresponding to the token to the target storage volume. If certain metadata in the range is not available in the corresponding metadata delta log, this means that the metadata has not been changed since snapshot creation, and the storage array 106-1 simply uses the source metadata in the copy operation.

5. The snapshot corresponding to the token remains in memory only as long as there is sufficient space in the transactional cache. If the transactional cache is full and the snapshot needs to be destaged, one of the following two options may be used:

(a) Destage snapshot to back-end storage, but keep it only for use by write-via-token commands. At this point, the destaged snapshot becomes a regular snapshot, except that data outside the protected range may be corrupt. This does not interfere with token-based data transfer operations, as the transfer only involves data within the protected range, and since the snapshot is not user accessible the potentially corrupt data does not create any problem.

(b) Discard the snapshot and expire the token. The host device 102-1 can then no longer use the token. This option is particularly beneficial in those situations in which the token has already been used once, since in such situations it will likely not be used again. For example, in practice, applications running on a host device typically create a token and then will use it, if at all, within a relatively short period of time.

As indicated previously, illustrative embodiments disclosed herein provide efficient token management using a memory-only snapshot that is lightweight in its metadata persistence requirements, has minimal impact on the source volume(s), and can be easily and rapidly created and deleted. Conventional approaches using only regular snapshots tend to result in increased system overhead and degraded performance.

At least portions of the functionality of the one or more storage controllers 110 and associated transactional cache infrastructure 112 may be implemented at least in part in the form of software that is stored in memory and executed by a processor.

It is to be understood that the particular set of elements shown in FIG. 1 for efficient token management is presented by way of illustrative example only, and in other embodiments additional or alternative elements may be used. Thus, another embodiment may include additional or alternative systems, devices and other network entities, as well as different arrangements of modules and other components.

It is therefore to be appreciated that these and other features of illustrative embodiments are presented by way of example only, and should not be construed as limiting in any way.

An exemplary process for efficient token management in a storage system will now be described with reference to the flow diagram of FIG. 2. It is to be understood that this particular process is only an example, and that additional or alternative processes for efficient token management in a storage system may be used in other embodiments.

The example process for efficient token management in this embodiment includes steps 200 through 206. These steps are assumed to be performed by the storage array 106-1 and its one or more storage controller 110 utilizing at least portions of the transactional cache infrastructure 112, such as a transactional cache and associated control logic, but can involve other system components in other embodiments. For example, source and target storage volumes can be located on different ones of the storage arrays 106.

In step 200, a create-token command is received from a host device. For example, the create-token command is illustratively received in storage array 106-1 from one of the host devices 102 of system 100. The create-token command specifies one or more logical address ranges of one or more source storage volumes of the storage array. The create-token command may be an ODX command, although other types of commands may be used.

In step 202, responsive to receipt of the create-token command, the storage array creates the token, generates an in-memory snapshot of data in the one or more logical address ranges of the one or more source storage volumes, associates the in-memory snapshot with the token, and provides the token to the host device.

In step 204, a write-via token command is received from the host device. It is assumed that the write-via-token command is received from the same host device that generated the create-token command. For example, the write-via-token command is illustratively received in the same storage array 106-1 from the same one of the host devices 102 of system 100 that sent the create-token command, although this may not be the case in other embodiments, such as in an arrangement in which one host device generates the create-token command and then provides the resulting token to another host device for use by that other host device in a write-via-token command. The write-via-token command specifies the token and one or more logical address ranges of one or more target storage volumes.

In step 206, responsive to receipt of the write-via-token command, the storage array determines whether or not differential metadata of the storage array includes one or more entries for the one or more logical address ranges of the one or more source storage volumes, and controls execution of the write-via-token command based at least in part on the determination.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for efficient token management in a storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different efficient token management processes for respective different sets of one or more storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 110 of storage arrays 106 that are configured to control performance of one or more steps of the FIG. 2 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or LXCs. The storage controllers 108, as well as other system components, may be implemented at least in part using processing devices of such processing platforms. For example, in a distributed implementation of a given one of the storage controllers 110, respective distributed modules of such a storage controller can be implemented in respective containers running on respective ones of the processing devices of a processing platform.

Additional aspects of illustrative embodiments will now be described in more detail with reference to FIGS. 3 through 9. It is to be appreciated that the particular components, features and functionality of these embodiments are examples only, and should not be construed as limiting in any way. For example, other types of transactional cache infrastructure can be used in other embodiments.

Figure 3:
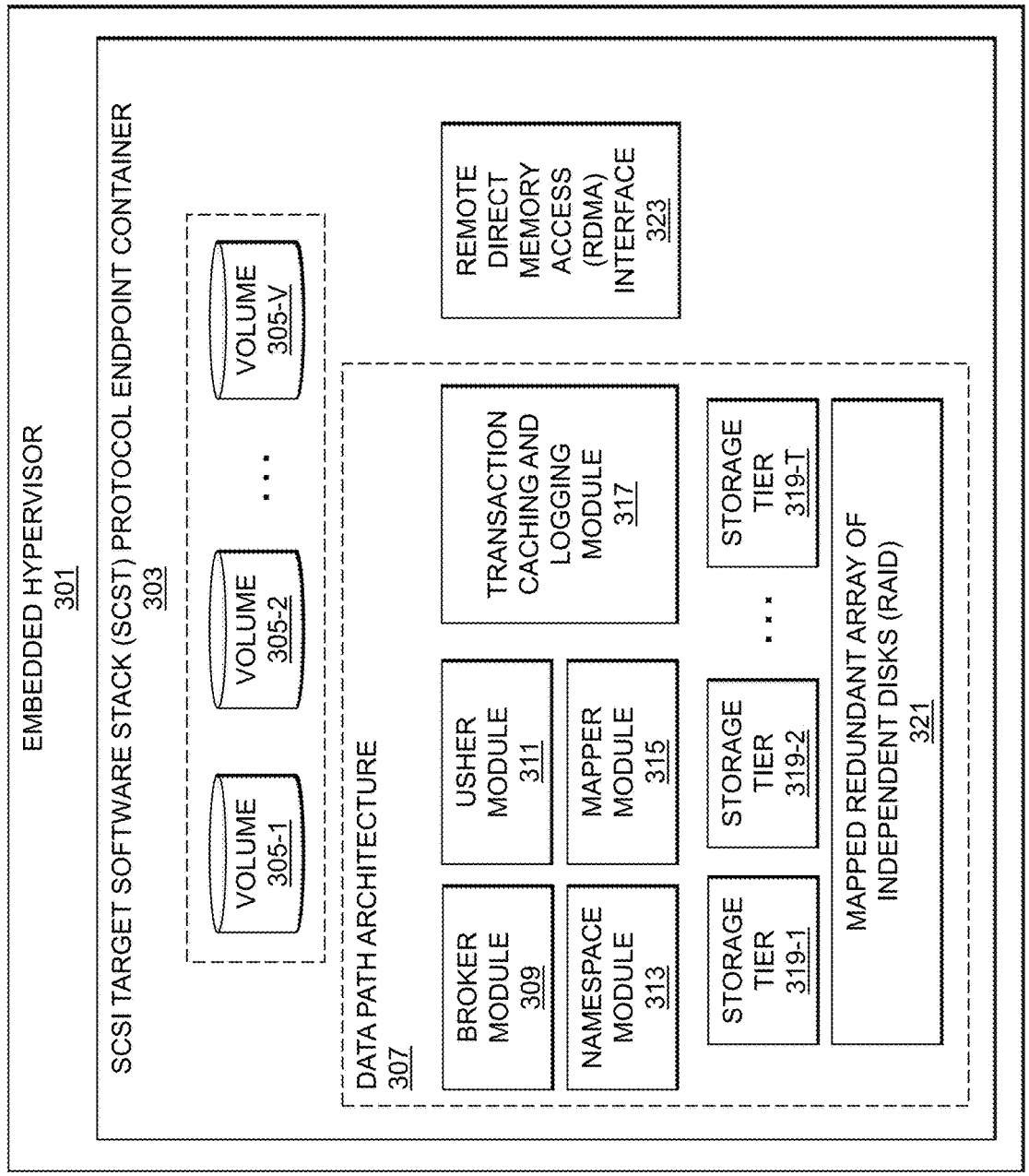
FIG. 3 is a block diagram of an embedded hypervisor implementing a data path architecture in an illustrative embodiment.

FIG. 3 shows a view of a data path architecture 307 for an IO stack of a storage array (e.g., storage array 106-1). The data path architecture 307 is assumed to be implemented on an embedded hypervisor 301 (e.g., a VMware ESXi™ hypervisor) that runs a base container 303 providing an SCSI target software stack (SCST) protocol endpoint. The embedded hypervisor 301 is an example of a "virtual" storage controller of a storage system (e.g., a virtual one of the storage controllers 110 in storage array 106-1). The SCST protocol endpoint container 303 includes a set of volumes 305-1, 305-2, . . . 305-V (collectively, volumes 305) and the data path architecture 307. The data path architecture 307 includes a broker module 309, usher module 311, namespace module 313, mapper module 315, and a transaction caching and logging module 317. The data path architecture 307 also includes a set of storage tiers 319-1, 319-2, . . . 319-T (collectively, storage tiers 319) and a mapped redundant array of independent disks (RAID) 321. These and other references to "disks" herein are intended as general storage media references and should not be construed as requiring the use of rotational storage media such as HDDs. The transaction caching and logging module 317 is configured to utilize remote direct memory access (RDMA) interface 323 as described in further detail below.

The broker module 309 is configured to facilitate communication amongst the various other modules of the data path architecture 307. In some embodiments, the data path architecture 307 implements a layered services model (e.g., for copy engines, replication, migration, etc.). The usher module 311 is configured to implement IO request queues, including priority share-based scheduling and Quality of Service (QoS) for IO requests in such queues. The namespace module 313 is configured to implement active/ active "thin" volumes and maintain volume attributes. The namespace module 313 is also configured to implement a key-value (K-V) store and directories. The mapper module 315 is configured to implement a thin mapping layer using log-structured writes, with inline compression, deduplication and pattern matching functionality. The mapper module 315 is also configured to implement functionality for generating snapshots and determining snapshot differentials, for performing space accounting, and for file system checking (e.g., using a tool such as a Linux file system consistency check (FSCK) tool). The transaction caching and logging module 317 is configured to implement transactions for the active/active volumes, to perform distributed locking, and to implement read/write-back and write-ahead logs. The transaction caching and logging module 317 may comprise two instances, one for data and one for metadata. The mapped RAID 321 is configured to implement distributed virtual striping (e.g., using 4+1 and 8+1 RAID5 implementations) and to provide thin rebuild and distributed sparing. The mapped RAID 321 may support various native block sizes (e.g., 512 bytes (B), 4096B or 4 kilobytes (KB), etc.).

In some embodiments, the usher module 311 implements a data plane polling model. From the producer side (e.g., of the SCST protocol endpoint), requests are submitted using per-core threads. Polling threads pull new IO requests to user space. The polling threads may execute when associated data plane threads are idle. Load balancing, affinity and QoS (e.g., share-based scheduling and traffic shaping) features may be provided.

The namespace module 313, as described above, is configured to create and expose thin block volumes, and to provide functionality for volume management and attributes as well as space management and accounting. The namespace module 313 enables or provides a namespace layer that utilizes a block interface with file-like semantics. In the namespace layer, volumes (e.g., volumes 305) are bound to block protocol endpoints (e.g., PE LUNs). The mapper module 315 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode table, and a "root" directory. The allocations provide references to extent allocators, used to manage free space, as well as to inodes. The extent allocators may use a binary buddy system, and enable efficient reclaiming and defragmenting functionality. In some embodiments, the minimum allocation size is 8 MB, and the minimum allocation size for virtual volumes (VVols) such as volumes 305 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global unique identifier (GUID) owner, object extent location, create timestamp and/or other timestamps, parent inode number, parent directory cookie, etc. The root inode references a root directory object that contains a list of file names and inodes, while additional inodes contain volume data (e.g., by allocating a data extent and inode, and adding the volume name and inode to the root directory). Multiple volume data extents may be created. Object handles may be used by the usher module 311 to submit IO thru handles (e.g., inodes) to avoid unnecessary name lookup.

The transaction caching and logging module 317 may implement a transactional cache and an associated transaction log. The transaction caching and logging module 317 may be viewed as an example of at least a portion of the transactional cache infrastructure 112 of storage array 106-1. The transactional cache, in some embodiments, is configured to provide read and write cache buffering with two instances (e.g., data and metadata). The transactional cache is configured to page data and metadata in and out of memory, and to provide local and distributed peer-to-peer (P2P) sticky locks. In some embodiments, an active/active configuration, an ALUA configuration, or combination thereof may be used. For example, the data path architecture 307 may be active/active, while SCST supports both active/active and ALUA. The transaction log provides write-ahead transaction logs, such as by using low latency mirrored NVRAMs for persistence. The transactional cache, for example, may be implemented in-memory (e.g., DRAM), while the transaction log is persisted to NVRAM.

The mapper module 315, as noted above, may provide a mapping layer of the data path architecture 307. The mapping layer may provide various functionality, such as enabling patterns, deduplication, compression, and mapping. Pattern functionality includes storing patterns (e.g., rather than pointer+data), and re-generates data on read, and may include 4 KB of 0s or 1s (where, in this context, 0s are different than unmapped space). Deduplication functionality includes the use of a fingerprint cache and read and compare validation. Compression functionality may include the use of various types of compression algorithms, including Intel QuickAssist Technology (QAT) hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 315 may utilize the storage tiers 319 (e.g., using flash tiers, storage-class memory (SCM) tiers, NVRAM tiers, etc.).

Figure 4A:
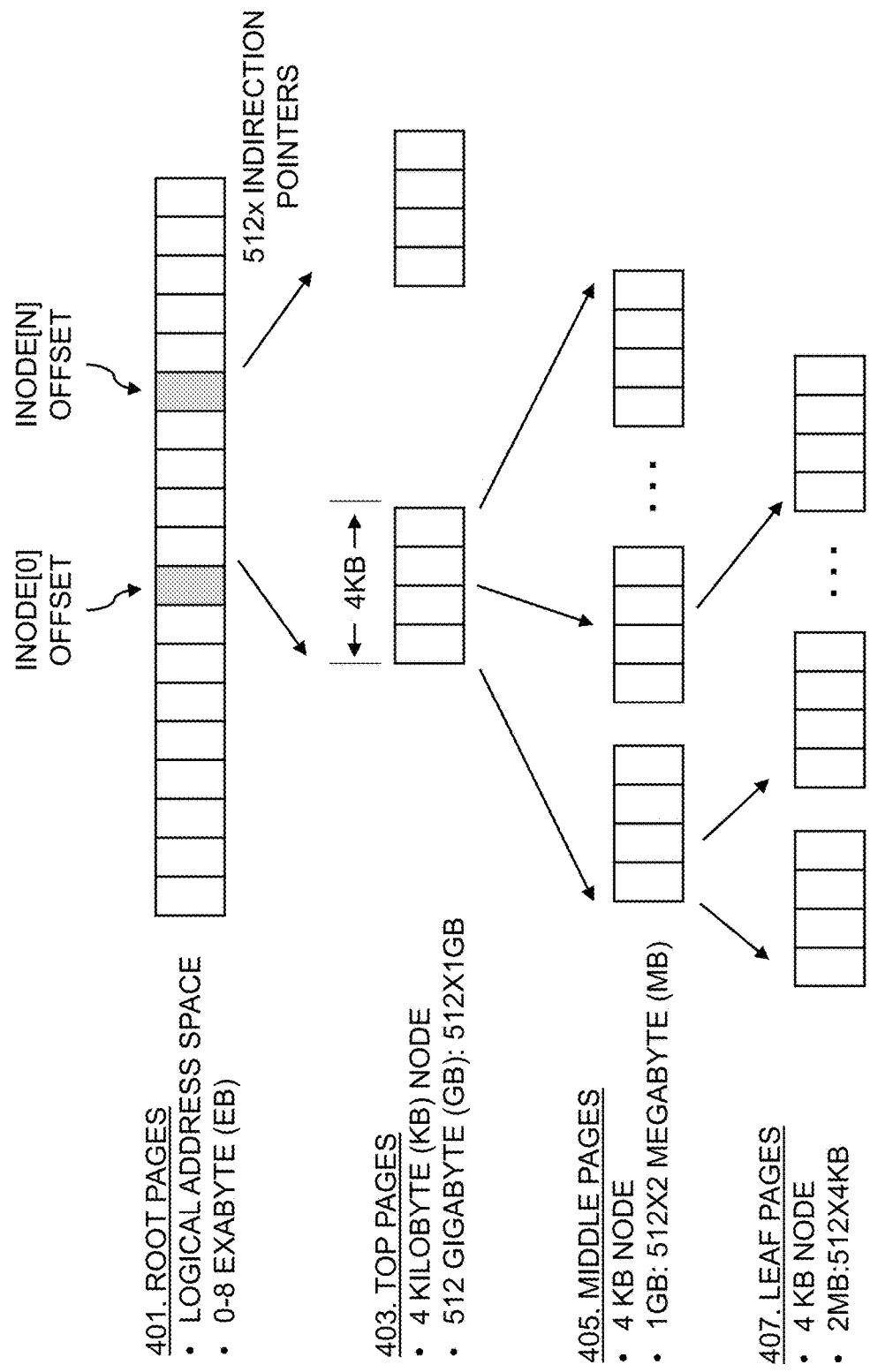
FIGS. 4A and 4B illustrate a tree structure for a logical address space in an illustrative embodiment.
Figure 4B:
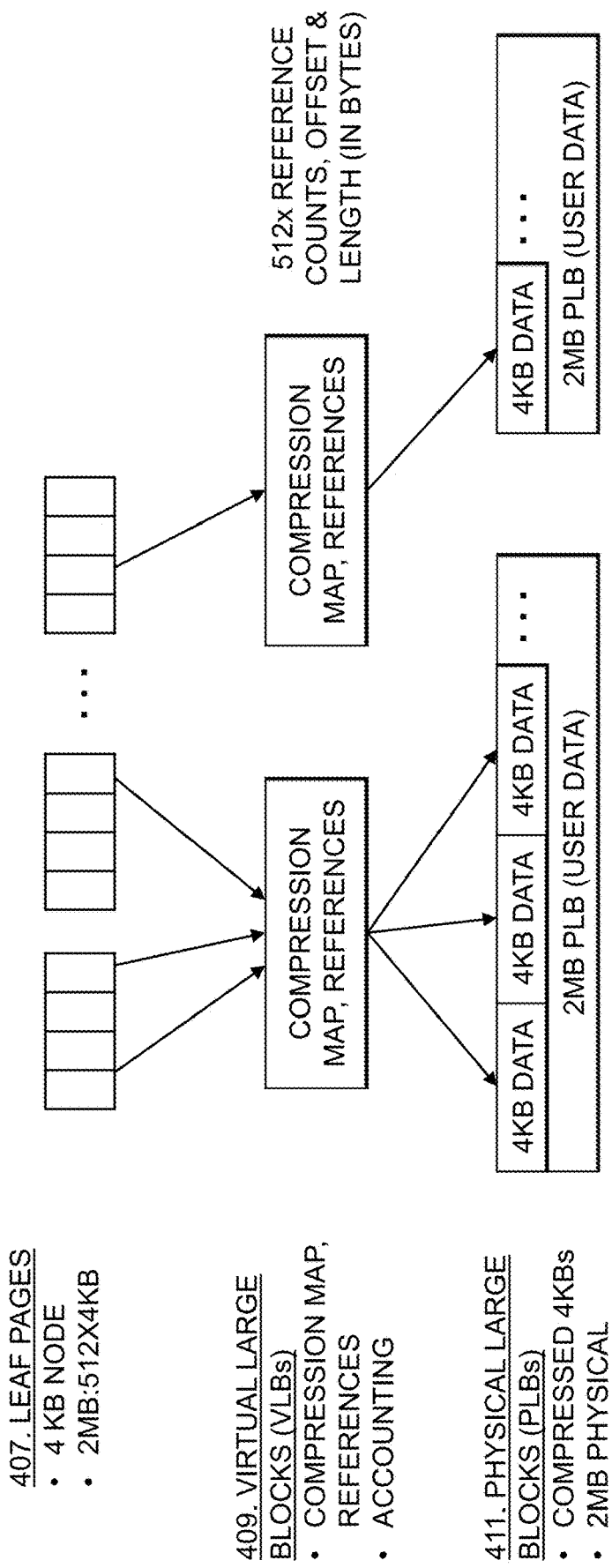

FIGS. 4A and 4B show a tree structure utilized by the mapper module 315 to store data in some embodiments. As noted above, the tree structure may comprise a 512-way B-tree structure, with levels for root pages 401, top pages 403, middle ("mid") pages 405, leaf pages 407, virtual large blocks (VLBs) 409, and physical large blocks (PLBs) 411. As illustrated in FIG. 4A, the root pages 401 provide a logical address space, which in some embodiments ranges from 0 to 8 exabytes (EB). The logical address space, which may be a thin logical address space, includes various inode offsets, two of which are labeled (e.g., inode[0] and inode [N]). Each of the inode offsets for the root pages 401 include a 4 KB node with 512 indirection pointers to respective ones of the top pages 403, each of the top pages 403 also has a 4 KB node with 512 pointers to respective ones of the middle pages 405, and each of the middle pages 405 has a 4 KB node with 512 pointers to respective ones of the leaf pages 407. Each of the leaf pages 407 may represent 2 megabytes (MB), and thus a given one of the middle pages 405 may represent 1 gigabyte (GB) (e.g., 512 of the leaf pages 407×2 MB) and a given one of the top pages 403 may thus represent 512 GB (e.g., 512 of the middle pages 405×1 GB).

As illustrated in FIG. 4B, each of the leaf nodes 407 may include 512 pointers to VLBs 409 each representing 4 KB (e.g., such that a given one of the leaf nodes 407 represents 2 MB as noted above, as 512×4 KB=2 MB). The VLBs 409 include reference counts, compression maps, and accounting information (e.g., offset and length, in bytes (B)) for the PLBs 411. Each of the PLBs 411 provides 2 MB physical space for storing user data (e.g., as a set of 4 KB compressed data blocks).

The mapper module 315 may access the tree structure of FIGS. 4A and 4B using keys, where a key for the root pages 401 level includes a host LBA and inode offset and index, where the index is the key divided by 256 terabytes (TB). At the top pages 403 level, the index is the key modulo 512 GB. At the middle pages 405 level, the index is the key modulo 1 GB. At the leaf pages 407 level, the index is the key modulo 2 MB.

Figure 5A:
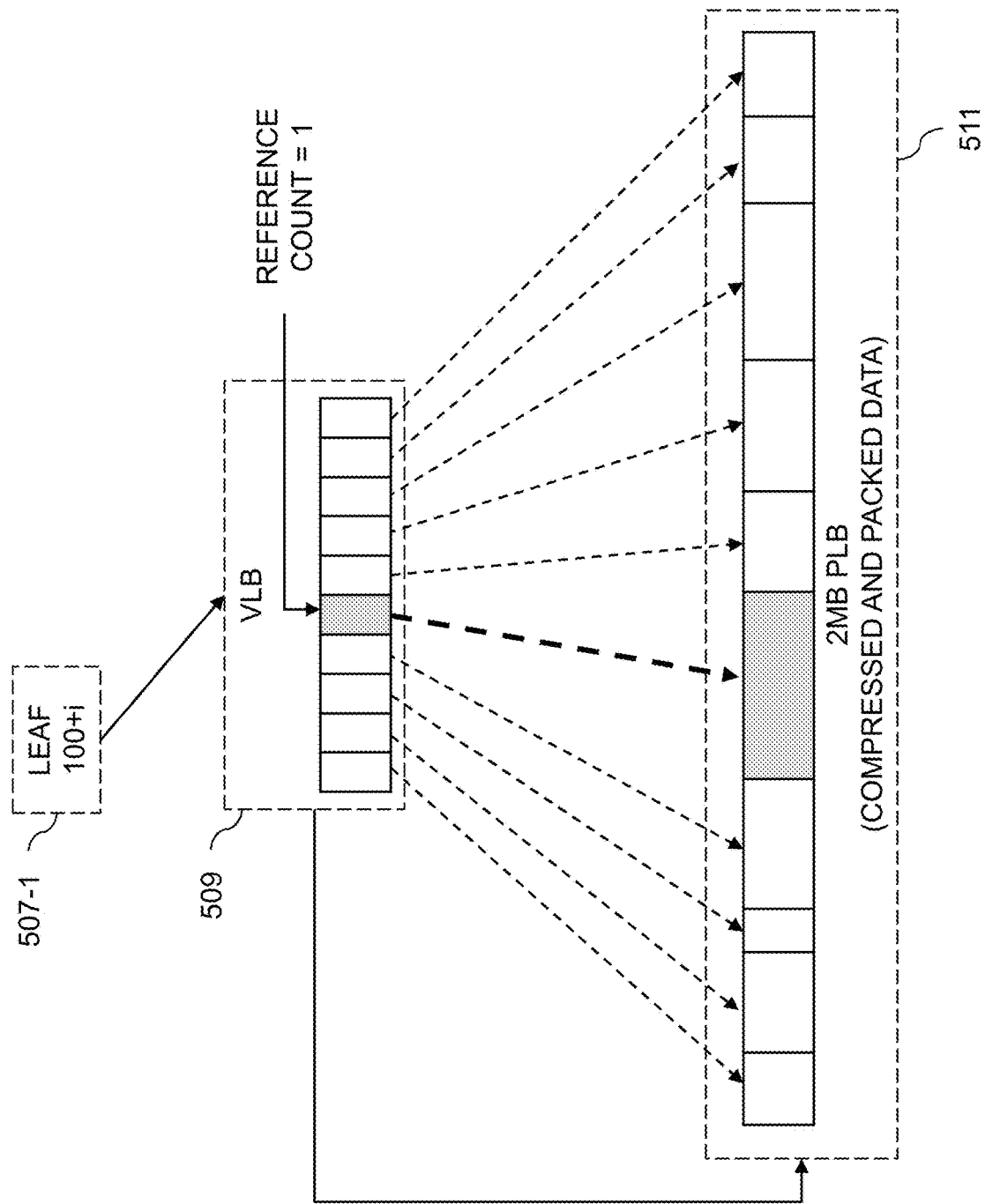
FIGS. 5A and 5B illustrate deduplication using a virtual large block of the tree structure of FIGS. 4A and 4B in an illustrative embodiment.
Figure 5B:
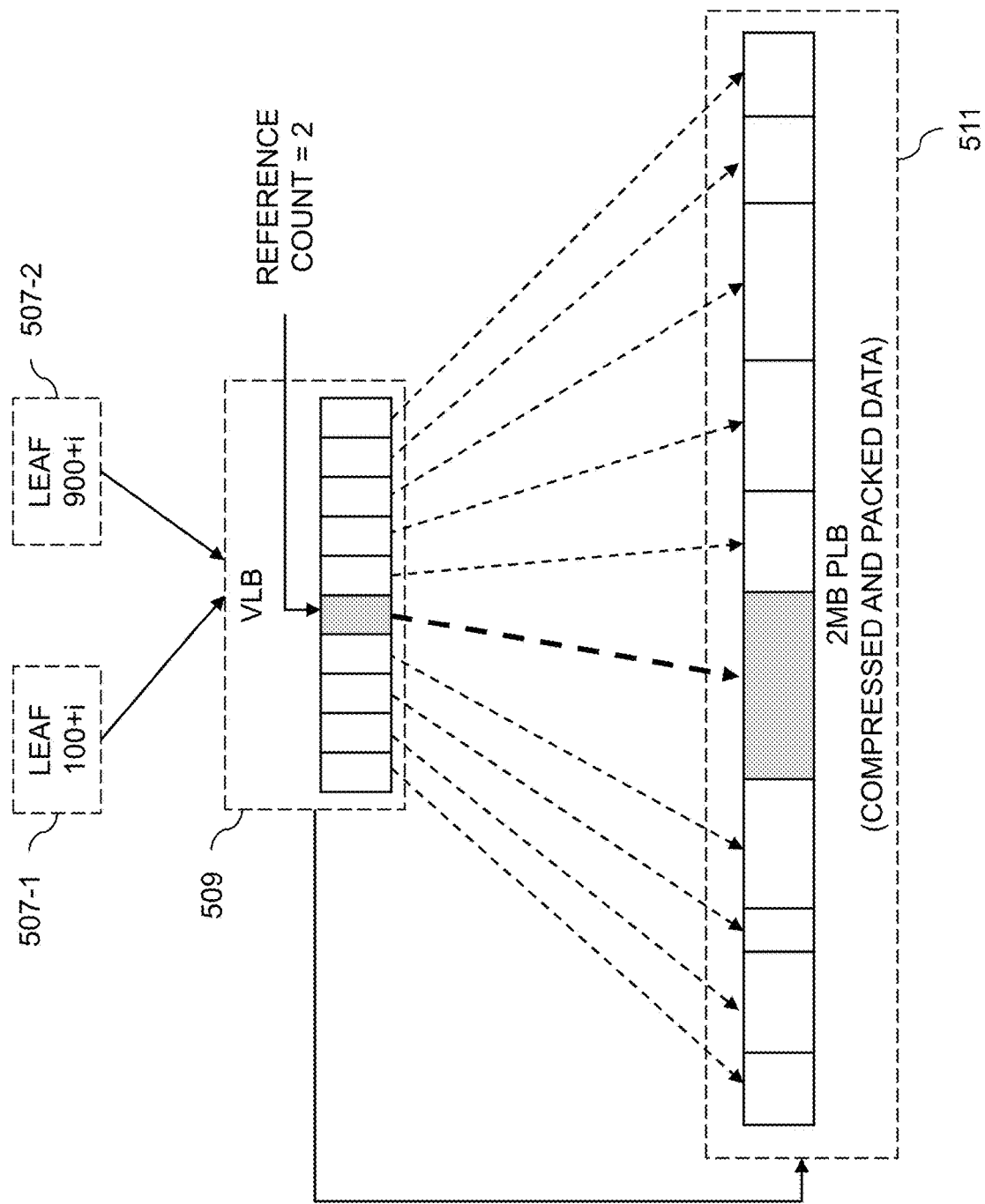

FIGS. 5A and 5B show deduplication using VLBs of the tree structure of FIGS. 4A and 4B. FIGS. 5A and 5B show a given VLB 509 and associated PLB 511 which includes 2 MB of compressed and packed data. The VLB 509 is assumed to contain a block address of the PLB 511, which provides a 2 MB data extent, and an array with 512 virtual entries. The virtual entries of a VLB, such as the 512 entries of VLB 509 in the example of FIGS. 5A and 5B, may be associated with respective virtual block addresses. Each VLB may thus be associated with a VLB extent that comprises a range of virtual block addresses (a VLB extent, in some cases, may include multiple VLBs such that its associated range of virtual block addresses span the multiple VLBs). Such an arrangement will be described in further detail below with respect to FIG. 7.

Each of the 512 virtual entries of the VLB 509 includes a byte offset to where a compressed 4 KB data portion starts in the PLB 511, as well as a byte length of the compressed 4 KB data portion and a reference count (e.g., the number of leaf page references to that compressed 4 KB data portion). In FIG. 5A, one leaf page 507-1 (e.g., leaf 100+i) references a particular compressed 4 KB data portion (e.g., shaded in gray) in the PLB 511. Thus, as shown in FIG. 5A, the reference count in the VLB corresponding to that portion (e.g., also shaded in gray) is 1. FIG. 5B shows that, when another leaf page 507-2 (e.g., leaf 900+i) also references that particular portion in PLB 511, the reference count for that portion in VLB 509 is updated to 2. In this way, two or more leaf pages can reference the same virtual block address. In the example of FIGS. 5A and 5B, deduplication has a granularity of 4 KB (e.g., the size of each compressed data portion in the PLB 511). Some embodiments enable a global deduplication domain, where any of the leaf pages can reference any of the compressed data portions in any of the PLBs. The reference count, however, may limit deduplication to a certain amount (e.g., 256:1).

To implement deduplication, a deduplication "fingerprint" cache may be utilized. The fingerprint cache may be implemented as a large K-V store, with N-way associative hashes providing fast, in-memory lookup that enables verification of deduplication with read and compare. Consider a piece of data, denoted $data_1$, that is found in the fingerprint cache. This may include hashing $data_1$, where the hash matches a key in the K-V store corresponding to a given VLB. The given VLB is then fetched to find the page referenced, and the corresponding portion of the associated PLB is read, decompressed and then compared to verify that $data_1$ is a duplicate. Consider another piece of data, denoted $data_2$, that is not found in the fingerprint cache. In this case, a new entry is added to the K-V store (e.g., a new K-V pair). If there is no remaining space, entries may be evicted using any suitable cache replacement algorithm, such as a least recently used (LRU) cache replacement algorithm. The $data_2$ is then stored as a new 4 KB data block in one of the PLBs.

The mapper module 315 may implement log-structured writes for efficient full stripe RAID writes (e.g., where each stripe is 2 MB continuing the example above) to flash memory using mapped RAID 321. Pending writes are flushed from the transactional cache or transaction log implemented by transaction caching and logging module 317. Patterns and duplications are subtracted, then the data is compressed and packed into a stripe. The full stripe is then written and mapped to the thin address space.

Figure 6A:
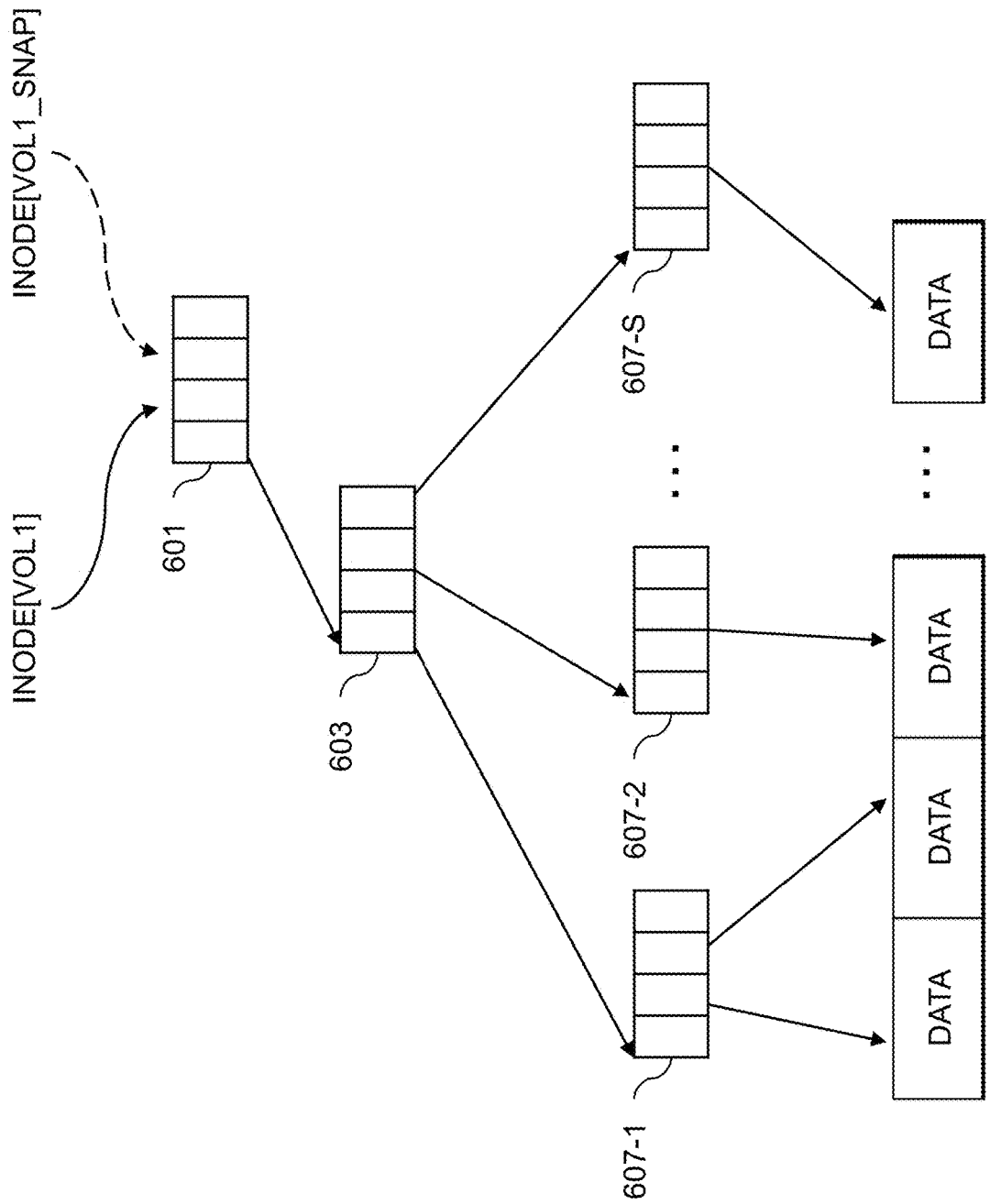
FIGS. 6A-6D illustrate snapshot functionality using the tree structure of FIGS. 4A and 4B in an illustrative embodiment.
Figure 6B:
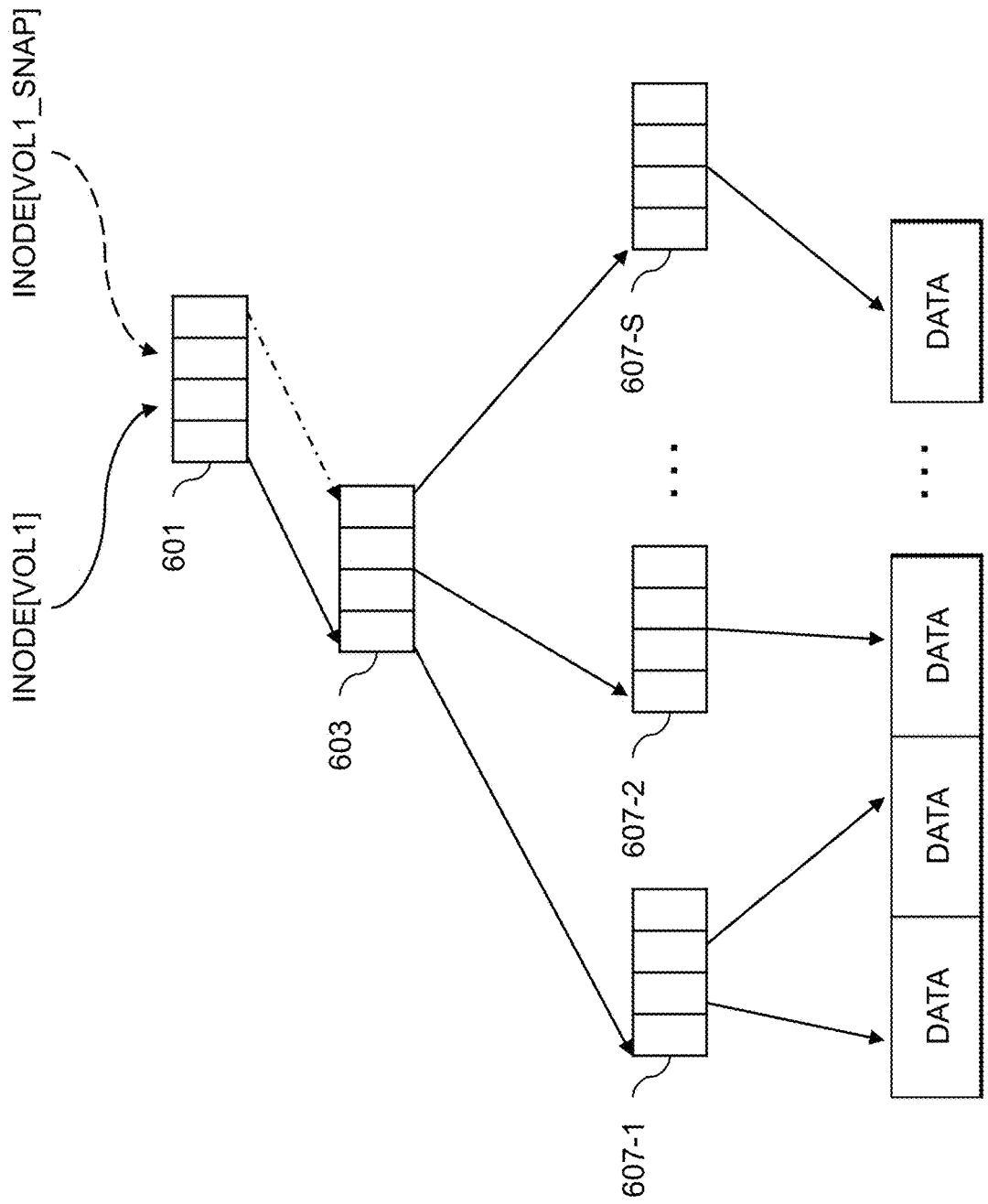
Figure 6C:
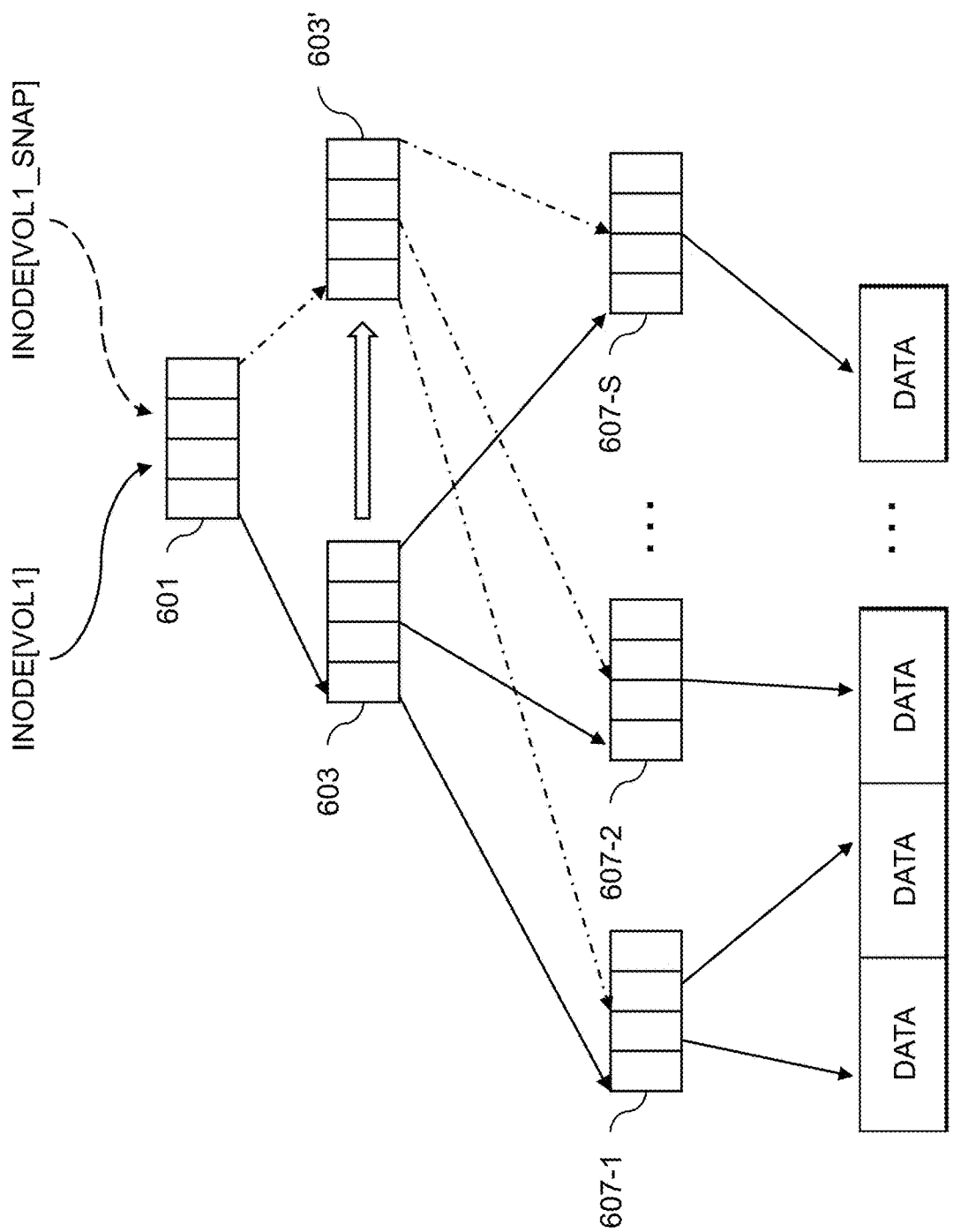
Figure 6D:
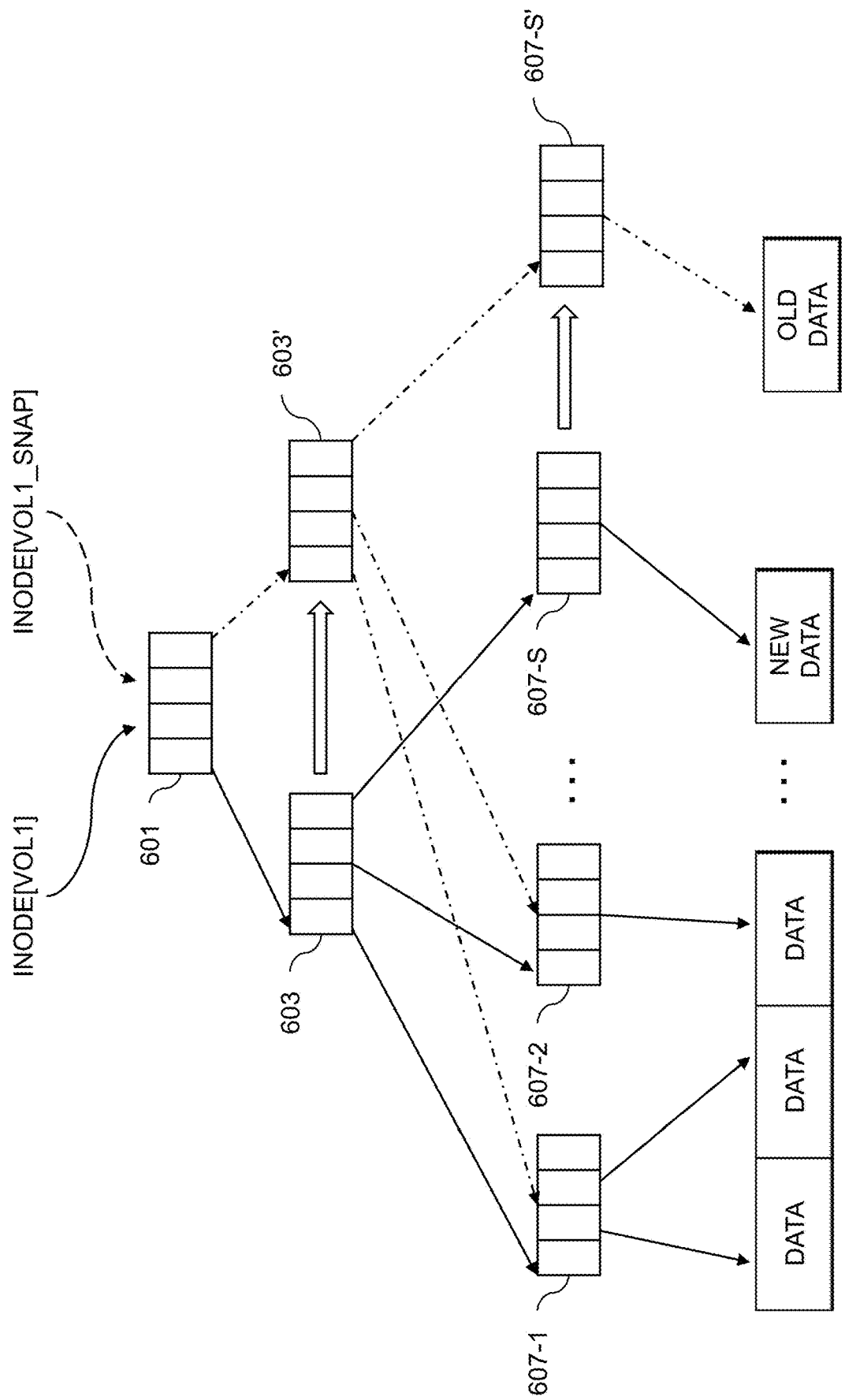

FIGS. 6A-6D illustrate snapshot functionality enabled by the mapper module 315 using the B-tree structure described above with respect to FIGS. 4A and 4B. As shown in FIG. 6A, a particular inode for a volume (e.g., inode[vol1]) references a particular root page 601, which references a top page 603, which references a set of middle pages (not shown), which references a set of leaf pages 607-1, 607-2, . . . 607-S (collectively, leaf pages 607) which reference underlying data (e.g., through VLBs and PLBs not shown). When a snapshot of the volume is created, another inode is allocated (e.g., inode[vol1_snap]) that references the root page 601 and copy-by-reference is performed as shown in FIG. 6B. On a first write to the volume (e.g., to vol1), the nodes of the tree structure are split in a recursive manner. First, the top page 603 is copied to top page 603' as shown in FIG. 6C. Middle pages (not shown) are then copied, follow by copying one of the leaf pages 607 affected by the write. As shown in FIG. 6D, this includes copying leaf page 607-5 to leaf page 607-S'. The new data to be written is stored in one or more VLBs and PLBs referenced by leaf page 607-S, while the old or existing data is stored in one or more VLBs and PLBs referenced by leaf page 607-S'.

The mapped RAID 321, as noted above, implements virtual striping (e.g., using 4+1 and 8+1 RAID5), enabling thin rebuild, distributed sparing, and various native block sizes (e.g., 512 B, 4096 B, etc.). The RAID geometry may be selected based on the number of SSD disks (e.g., with 6-9 SSDs, 4+1 RAID may be used, with 10+ SSDs, 8+1 RAID may be used). It should be noted that embodiments are not limited to using SSD disks in a RAID. In other embodiments, other types of disks or storage devices may be used. The description below, however, assumes the use of SSDs for clarity of illustration. In some cases, the mapped RAID 321 may use resiliency sets, as reliability may drop as more SSDs are grouped together. To constrain the fault domain, resiliency sets may be split once a threshold number of SSDs is reached (e.g., with a 25 SSD maximum, the resiliency set is split on adding a $26^{th}$ SSD).

In some embodiments, the mapped RAID 321 includes a disk layout that has a minimum number of 6 SSD disks (e.g., flash SSDs or 3DXP SSDs). Serial attached SCSI (SAS) expansion may be used to expand the number and size of disks used. In some embodiments, particular slots or disks (e.g., 2 or 4 NVRAM SSDs) may be reserved for use as the transaction log implemented by transaction caching and logging module 317. A global configuration database (DB) may be stored using 1 MB on each drive in the mapped RAID 321, which includes a GUID and drive state information. The mapped RAID 321 may include a RAID map DB that is 3-way mirrored across three of the disks, and includes information such as RAID type, width, etc. The mapped RAID 321 also utilizes metadata, data, and possibly other tiers. The mapper module 315 is configured to expand the tiers for more space, where expanding a tier includes forming a RAID geometry by allocating slices, adding to the RAID map, and returning to the mapper layer. A slice of the mapped RAID 321 may include 4 GB RAID allocation extents (NVRAM may use 128 MB), one or more "ubers" that each include N+1 slices grouped into a RAID set (e.g., 1+1, 4+1, 8+1, etc.), and one or more tiers each including a group of ubers.

In some embodiments, the data path architecture 307, on receiving an IO request from a host to store data, will write the data quickly and persistently to a cache (e.g., the transactional cache implemented by the transaction caching and logging module 317) and then send an acknowledgement to the host. The data path architecture 307 will then utilize the mapper module 315 to identify and subtract patterns and duplicates in the data to form a flush set (e.g., a 2 MB flush set). The flush set is then compressed, packed and written to 2 MB stripes (e.g., in the mapped RAID 321).

In a log structured file system, such as that used in the data path architecture 307, mappings (e.g., as provided using the mapping module 315) provide critical information that links the user data to the physical location on the storage devices (e.g., SSDs). With deduplication, multiple logical blocks can point to the same virtual block address of a given VLB. In this case, the VLB includes virtual entries for each virtual block address, with a given virtual entry maintaining a reference count indicating how many logical blocks point to a given virtual block address. When file system checks (e.g., using a tool such as FSCK) are run, the consistency of the map is validated by cross-checking the reference count stored in the virtual entry of the VLB with the number of logical blocks pointing to the virtual block address.

Figure 7:
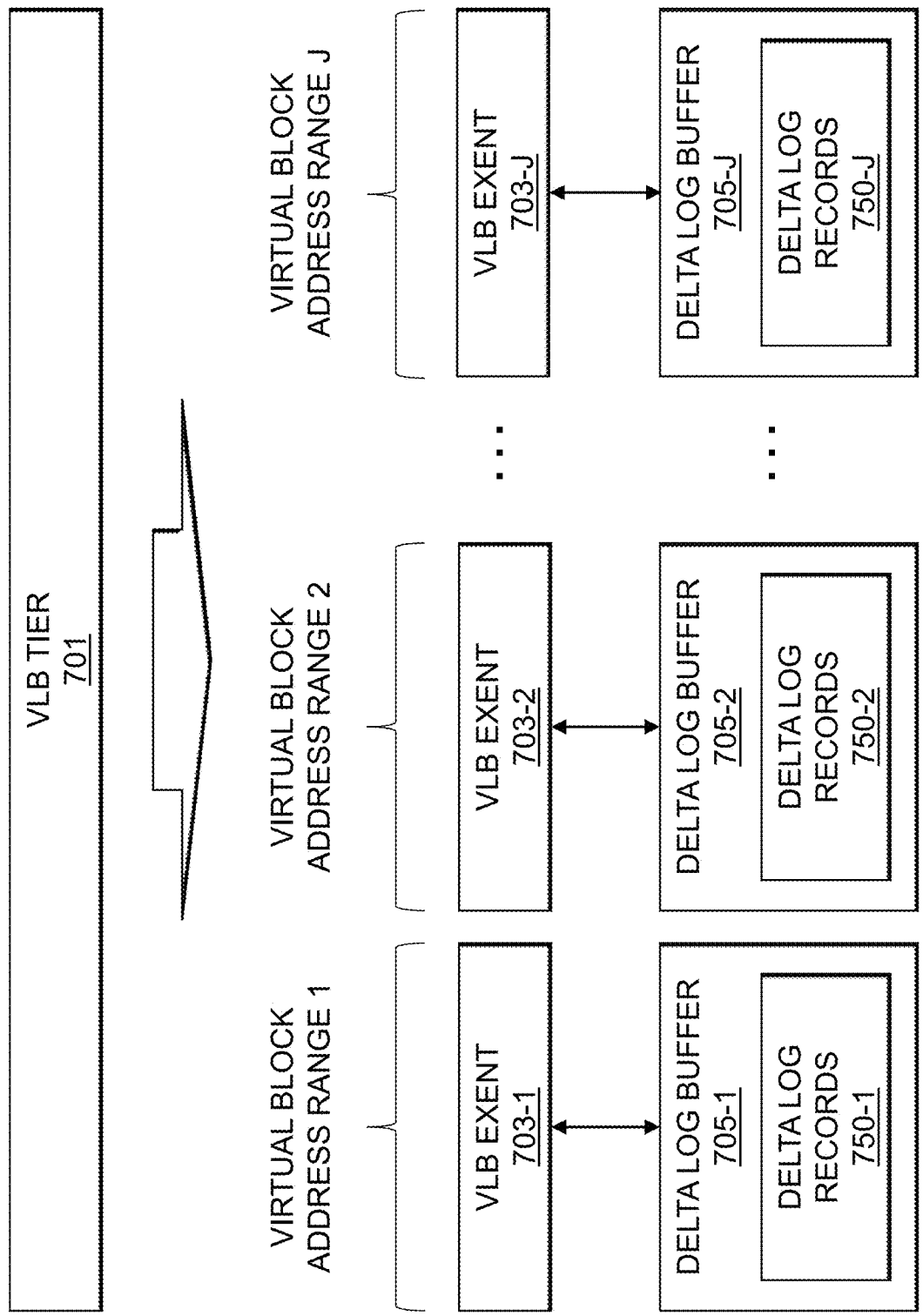
FIG. 7 illustrates a delta log infrastructure for virtual large blocks of a tree structure in an illustrative embodiment.

In some embodiments, a storage array is configured to utilize "delta" logs for accumulating records into buffers and then persisting such records as a logical tree (e.g., the tree structure of FIGS. 4A and 4B) is traversed. For example, the VLB level (e.g., VLBs 409) of the tree structure shown in FIGS. 4A and 4B may be split into a number of VLB extents representing a range of virtual block addresses. This is illustrated in FIG. 7, which shows a VLB tier 701, where different virtual block address ranges are associated with different VLB extents 703-1, 703-2, . . . 703-J (collectively, VLB extents 703). In some embodiments, each of the VLB extents 703 is associated with one of the VLBs 409 in the tree structure of FIGS. 4A and 4B. In other embodiments, however, a given one of the VLB extents 703 may be associated with multiple ones of the VLBs 409 (e.g., the virtual block address space of the given VLB extent may include virtual block addresses that are in two or more of the VLBs 409). Each of the VLB extents 703-1, 703-2, . . . 703-J is associated with a delta log buffer 705-1, 705-2, . . . 705-J (collectively, delta log buffers 705) that stores delta log records 750-1, 750-2, . . . 750-J (collectively, delta log records 750) for its associated one of the VLB extents 703. In some embodiments, each of the delta log buffers 705 is 2 MB in size, and accumulates delta log records (e.g., as the logical tree is traversed by a file system check).

In traversing the above-noted logical tree in conjunction with scanning of leaf pages 407, pointers to virtual entries of the VLBs 409 are encountered. Each such pointer is handed to the delta logging infrastructure and stored as one of the delta log records 750. Based on the virtual block address of pointed to by the leaf page 407 being scanned, an appropriate one of the VLB extents 703 is determined and a delta log entry or record (e.g., including an identifier for a virtual entry for the virtual block address and other information, such as the logical page address of the leaf page that points to the virtual block address as described in further detail below) is put into the appropriate one of the delta log buffers 705.

A presence of a delta log record for a virtual block address or virtual entry indicates a reference count of one. If there are ten delta log records for a particular virtual block address, the reference count is ten. When a given one of the delta log buffers 705 is full, the delta log records 750 stored therein are written out to an associated disk (e.g., the associated one of the VLB extents 703). Once all the leaf pages 407 are traversed, all of the pointers to the virtual block addresses are accumulated in the appropriate VLB extents 703.

After traversing the logical tree structure, the delta logging moves to a consolidation phase where each of the VLB extents 703 is read in intervals (e.g., 2 MB at a time) and, for each delta log associated with a given virtual block address, the reference count for the given virtual block address is incremented. Since one VLB extent is processed at a time, the reference counts may be consolidated in-memory.

As described above, some file systems support deduplication features. In cases where multiple storage objects point to the same copy of a piece of data, the logical pages of such storage objects point to the same virtual block address. A given virtual entry for a given virtual block address keeps a reference count to track the number of logical pages that point to the given virtual block address. During recovery of such file systems, it is difficult to keep track of each of the references for each of the virtual block addresses in-memory, or to store such information on a disk and read/write it back as many times as logical pages refer to the virtual block addresses. Thus, as described above, delta logging approaches may be used. In some embodiments, logical page addresses (e.g., addresses of the leaf pages 407) are stored in the delta log records for facilitating creation of a map of corrupted virtual entries back to the logical space (e.g., leaf pages 407, mid pages 405, etc., of a logical tree structure such as that illustrated in FIGS. 4A and 4B).

During logical space browsing conducted as part of a file system check (e.g., using FSCK or another suitable tool), delta log records are submitted to a delta log infrastructure (e.g., to delta log buffers 705 which, when full, may be flushed or persisted to disk) as the leaf pages 407 are traversed. To facilitate mapping of corrupted virtual entries (e.g., cases where an expected reference count determined by consolidating delta logs does not match the actual reference count in virtual entries of the VLBs 409), the leaf page addresses that point to the virtual entries (e.g., in the VLBs 409) may be stored in the delta log records. Thus, once all the logical space is browsed, the delta log infrastructure has all the delta log records for each of the logical references to each of the virtual block addresses, as well as the address of the logical pages that are the source of each of the logical references.

As described above, a storage array in some embodiments includes a data path architecture 307 including a logical address space that uses a logical tree mapping (e.g., as maintained by the mapper layer of the data path architecture 307 implemented using mapper module 315) for mapping the logical address space to a physical address space. The logical address space may be represented by the root pages 401, top pages 403, mid pages 405 and leaf pages 407 in the tree structure shown in FIGS. 4A and 4B, with the leaf pages 407 including pointers to different virtual entries in the VLBs 409 that map to particular physical block addresses in the PLBs 411 as illustrated in FIGS. 4A and 4B.

In the logical address space of the mapper layer provided by mapper module 315 in the data path architecture 307, each logical page may be associated with various metadata, including an indirect data page (IDP) address (e.g., IDP 100, IDP 200, etc.). The IDP is an example of what is more generally referred to as an indirect block address. Each logical page may also include an array of IDP addresses that the logical page points to. The logical page that is associated with a particular IDP address is also referred to as an IDP page.

When performing recovery and other tasks, there may be a need to find the storage objects (e.g., volumes, snapshots, clones, etc.) that point to a particular logical page (e.g., a particular IDP page) in the mapper's logical address page. As described above, for example, it may be desired to find the mappings to a given corrupted IDP page. To do so, two relationships are used: vertical relationships and horizontal relationships. The vertical relationship is navigated by the offset of a given storage object. The horizontal relationship represents a parent-child relationship for a given snapshot family. Information associated with the vertical and horizontal relationships may be stored as a "back pointer" within each IDP page (e.g., top pages 403, mid pages 405 and leaf pages 407 in the logical tree structure of FIGS. 4A and 4B). The relevant information from the back pointer that is used to navigate the vertical and horizontal relationships, in some embodiments, include a namespace address (e.g., from a namespace layer of the data path architecture 307 implemented by namespace module 313), extent offset, and snapshot group identifier (ID).

A two-level data structure may be built-up during the initial browsing of the top IDP pages (e.g., top pages 403) associated with each storage object. This two-level data structure maintains the relationships of the set of storage objects within a given snapshot (snap) group. In some embodiments, the two level-data structure may be viewed as a hash of binary trees, with there being a binary tree for each snap group. The first level of the two-level data structure is navigated based on the snap group IDs to find binary trees in the second level that characterize the relationships between storage objects for the snapshot groups associated with a selected snap group ID. Given a binary tree for a given snap group ID, it is possible to iterate over the storage objects in the snap group and traverse the vertical relationships using the stored namespace address for the storage object.

A client (e.g., one of host devices 102, the file system check tool such as FSCK, etc.) that wants to search storage objects may provide the desired IDP page address, snap group ID, and extent offset. Given the snap group ID and extent offset from the back pointer of any IDP in the mapper address space, all the storage objects in the given snap group ID may be iterated over to check whether the desired IDP page address is found at the given extent offset. There are various use cases in which such reverse logical lookups are required. For example, such reverse logical lookups may be used to find the vertical and horizontal IDP pages for a given corrupted or orphaned IDP page. Being able to find the vertically and horizontally connected IDP pages provides the ability to potentially fix the corruption related to that IDP page. As another example, such reverse logical lookups may be used to report a corruption that cannot be repaired and results in data loss for all corresponding storage objects that map to the corrupted metadata object (e.g., an IDP page, a VLB object, etc.).

Figure 8:
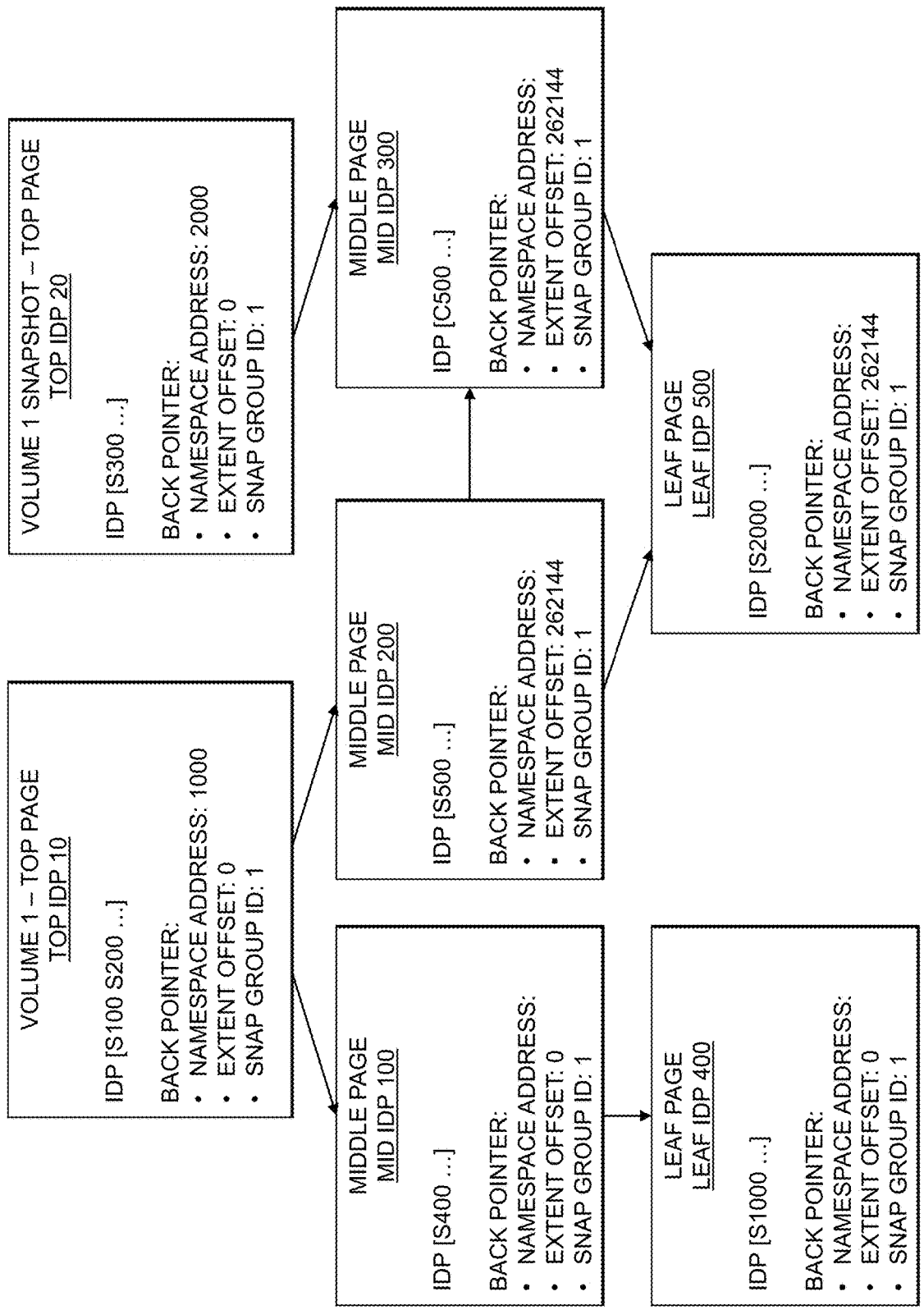
FIG. 8 shows a portion of a logical tree mapping for a reverse logical lookup of a given logical page address in an illustrative embodiment.

Examples of reverse logical lookups will now be described with respect to FIG. 8, which shows a logical tree structure (e.g., selected as described above from a two-level data structure) for a particular snap group ID (e.g., snap group ID=1). More particularly, FIG. 8 illustrates a reverse lookup for reporting corruption at leaf IDP 500. The leaf IDP 500 has an extent offset of 262144 and a snap group ID of 1. The snap group ID of 1 is used to index into the two-level data structure described above to find the binary tree for that given snap group. Once the binary tree is retrieved, then the storage objects can be iterated over to search them vertically for the leaf IDP address of 500. As shown in FIG. 8, the search first traverses through storage objects of volume 1 for the given extent offset, starting with the stored namespace address for the volume 1's starting top IDP page 10. This vertical search goes to the mid IDP 200, in which the matching address of 500 is found for the corrupted leaf IDP. Thus, volume 1 with the corresponding extent offset can be reported as corrupted. Next, the search traverses through the storage objects of a snapshot of volume 1 through top IDP page 20. For the given extent offset, the lookup looks at mid IDP page 300 which has the address 500 for the corrupted leaf IDP.

In FIG. 8, each of the IDP pages (e.g., top IDP pages 10 and 20, mid IDP pages 100, 200 and 300, and leaf IDP pages 400 and 500) includes an array of IDP addresses. For example, top IDP 10 includes IDP addresses of S100, S200, etc. The "S" in such addresses denotes source, while the "C" in addresses for other ones of the IDP pages in FIG. 8 denotes copy (e.g., "C500" in mid IDP page 300). Each of the IDP pages shown in FIG. 8 also includes a back pointer as described above, with a namespace address, extent offset and snap group ID.

Another example of an efficient token management process, in this case implemented using a storage array configuration and associated metadata structures of the type described in conjunction with FIGS. 3 through 8 above, will now be presented with reference to FIG. 9. As in the FIG. 2 embodiment, it is to be understood that this particular process is only an example, and that additional or alternative processes for efficient token management in a storage system may be used in other embodiments.

The example process for efficient token management in this embodiment includes steps 900 through 910. These steps are assumed to be performed by the storage array 106-1 and its one or more storage controllers 110 utilizing at least portions of the transactional cache infrastructure 112, such as a transactional cache and associated control logic, but can involve other system components in other embodiments.

In step 900, the storage array receives a create-token command from a host device, such as host device 102-1, creates a token, and creates a corresponding in-memory snapshot in a transactional cache. As indicated elsewhere herein, the create-token command specifies one or more logical address ranges of one or more source storage volumes of the storage array, and may be an ODX command or another type of command.

In step 902, the storage array avoids destaging of the in-memory snapshot from the transactional cache. In other words, the storage array attempts to maintain the in-memory snapshot in the transactional cache without destaging it to disk or otherwise persisting it to disk or other back-end storage devices.

In step 904, a determination is made as to whether or not a write-via-token command has been received for the created token. If a write-via-token command has been received for the created token, the process moves to step 906, and otherwise bypasses step 906 and instead moves to step 908 as indicated.

In step 906, the storage array executes the write-via-token command using delta log buffers of the type previously described to obtain metadata for any portion of the protected data that was written since creation of the in-memory snapshot.

In step 908, a determination is made as to whether or not the token has expired. If the token has expired, the process moves to step 910, and otherwise returns to step 904 to await the arrival of a first or additional write-via-token command for the created token. This embodiment therefore assumes that the token can be used multiple times.

In step 910, which is reached after expiration of the token, the storage array deletes the in-memory snapshot from the transactional cache. As described elsewhere herein, other conditions can lead to deletion of the in-memory snapshot from the transactional cache. For example, in some embodiments, the token is automatically invalidated after a single use, and the in-memory snapshot is deleted at that point from the transactional cache.

As in FIG. 2, the particular processing operations and other system functionality described in conjunction with the flow diagram of FIG. 9 are presented by way of illustrative example only, and should not be construed as limiting the scope of the disclosure in any way. Alternative embodiments can use other types of processing operations for efficient token management in a storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different efficient token management processes for respective different sets of one or more storage volumes or for different storage systems or portions thereof within a given information processing system. Also, functionality such as that described in conjunction with the flow diagram of FIG.

9 can be implemented at least in part in the form of one or more software programs stored in memory and executed by a processor of a processing device such as a computer or server.

Illustrative embodiments disclosed herein provide significant advantages relative to conventional arrangements. For example, illustrative embodiments provide techniques for efficient token management in a storage system. Such embodiments can provide particularly efficient management of tokens associated with ODX commands and other types of commands used in implementing token-based data transfers.

In some embodiments, efficient token management is provided in a manner that advantageously avoids the need to persist token-related snapshots and their associated metadata in back-end storage devices while also avoiding adverse performance impacts on source storage volumes.

These and other embodiments are illustratively configured to respond quickly to create-token commands, and to protect the data represented by the tokens, with a lightweight metadata footprint and minimal impact on the source volumes.

Moreover, system computational and storage overhead associated with persistence of snapshots in support of token-based data transfers is reduced, and overall system performance is improved.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for efficient token management in a storage system will now be described in greater detail with reference to FIGS. 10 and 11. Although described in the context of system 100, these platforms may also be used to implement at least portions of other information processing systems in other embodiments.

Figure 10:
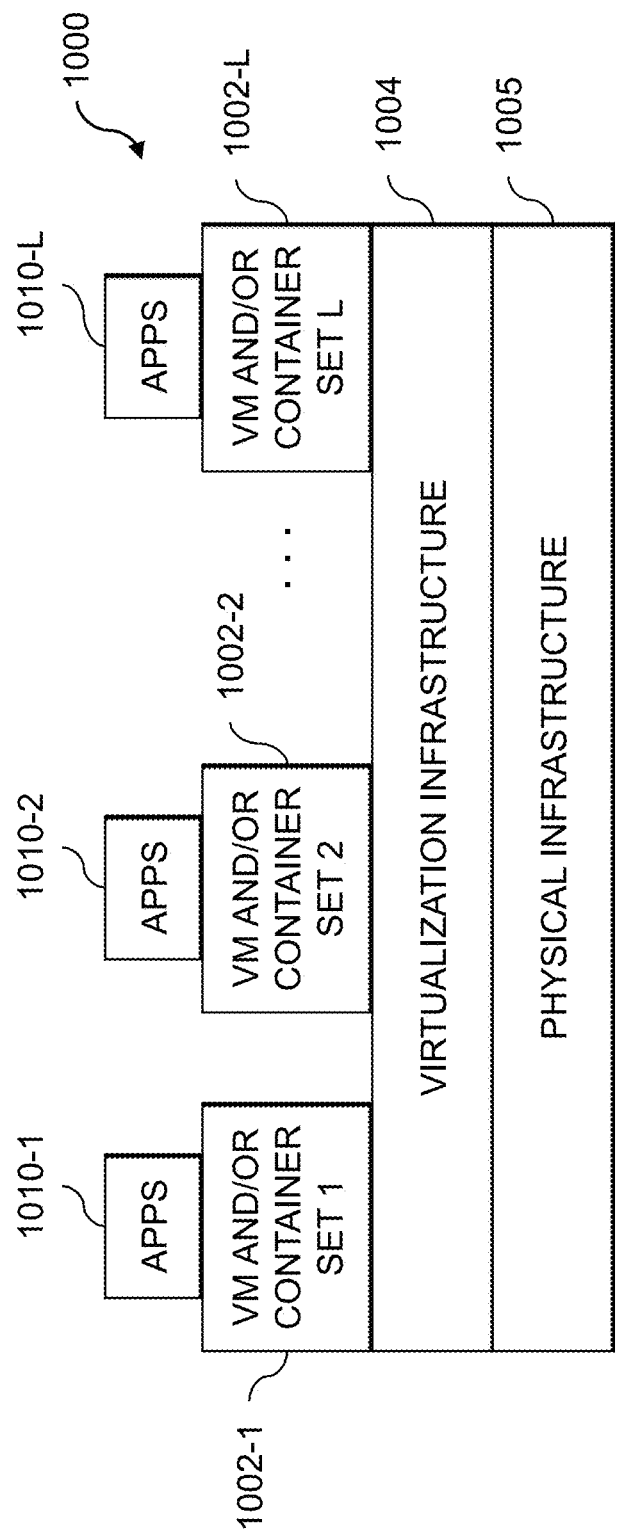
FIGS. 10 and 11 show examples of processing platforms that may be utilized to implement at least a portion of an information processing system in illustrative embodiments.
Figure 11:
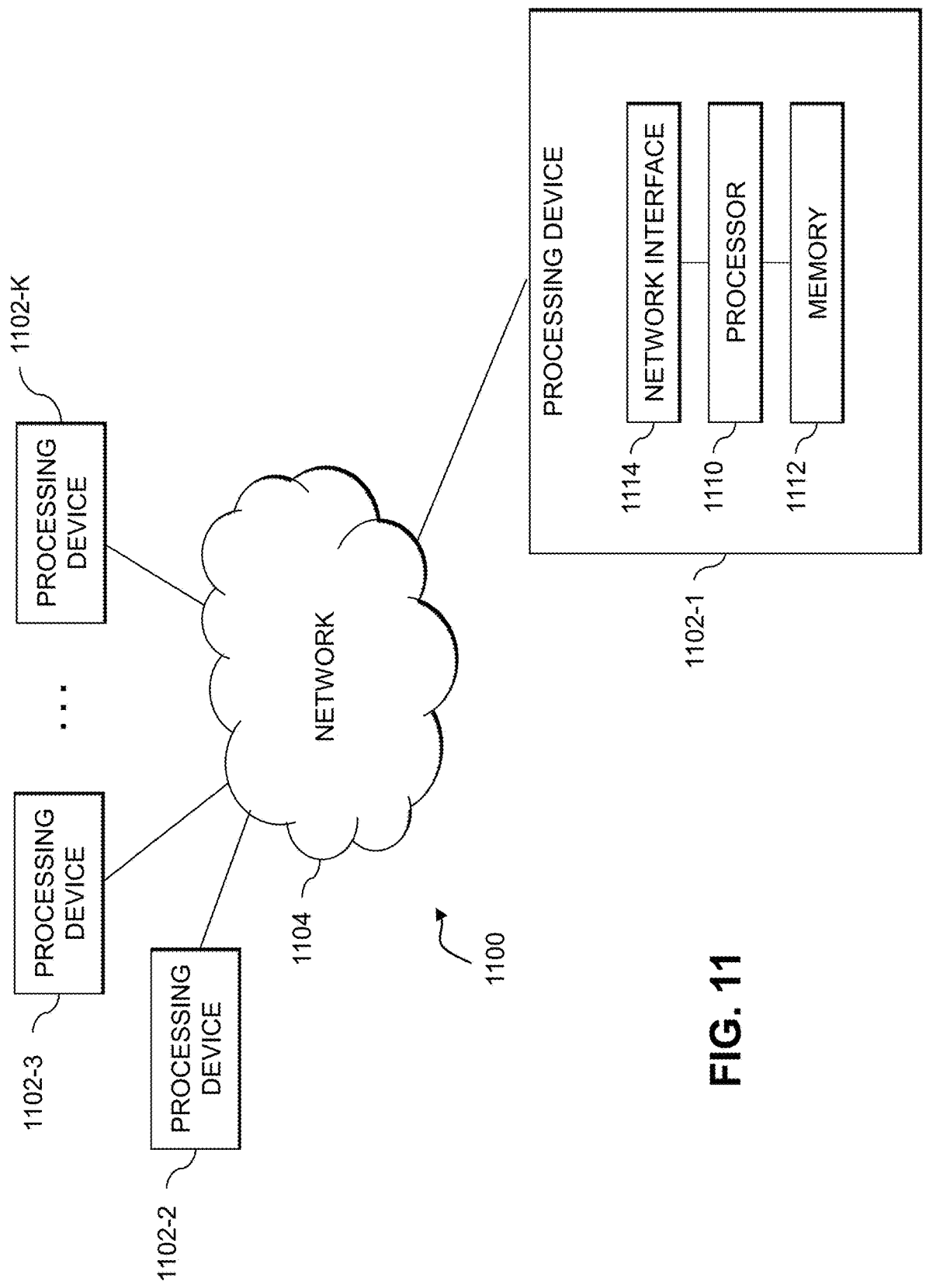

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 102-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for efficient token management in a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types and arrangements of information processing systems, storage systems, storage devices, storage controllers, transactional cache infrastructure, tokens, commands, metadata, snapshots, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to receive a create-token command from a host device, the create-token command specifying one or more logical address ranges of one or more source storage volumes of a storage system;
   responsive to receipt of the create-token command, to create a token, to generate an in-memory snapshot of data in the one or more logical address ranges of the one or more source storage volumes, to associate the in-memory snapshot with the token, and to provide the token to the host device;
   to receive a write-via-token command from the host device, the write-via-token command specifying the token and one or more logical address ranges of one or more target storage volumes; and
   responsive to receipt of the write-via-token command, to determine whether or not differential metadata of the storage system includes one or more entries for the one or more logical address ranges of the one or more source storage volumes, and to control execution of the write-via-token command based at least in part on the determination;
   wherein determining if differential metadata of the storage system includes one or more entries for the one or more logical address ranges of the one or more source storage volumes comprises:
   initiating an operation for copying of metadata for the one or more logical address ranges of the one or more source storage volumes from the in-memory snapshot to the one or more target storage volumes; and
   determining in conjunction with the copying whether or not at least a portion of the metadata is in one or more metadata delta logs of the differential metadata; and
   wherein controlling execution of the write-via-token command based at least in part on the determination comprises:
   responsive to at least a portion of the metadata being in one or more metadata delta logs of the differential metadata, utilizing that portion of the metadata in the one or more metadata delta logs in the copying; and
   copying remaining portions of the metadata from the in-memory snapshot to the one or more target storage volumes;
   the controlling execution of the write-via-token command thereby being separated into at least first and second distinct parts, the first part utilizing the portion of the metadata in the one or more metadata delta logs, and the second part utilizing the remaining portions from the in-memory snapshot.

2. The apparatus of claim 1 wherein the at least one processing device comprises a storage controller of the storage system.

3. The apparatus of claim 1 wherein the one or more target storage volumes are part of the same storage system that includes the one or more source storage volumes.

4. The apparatus of claim 1 wherein the create-token command and the write-via-token command comprise respective Offloaded Data Transfer (ODX) commands.

5. The apparatus of claim 1 wherein the in-memory snapshot is not subsequently persisted in one or more back-end storage devices of the storage system.

6. The apparatus of claim 1 wherein responsive to receipt of a write operation directed to at least one logical address within the one or more logical address ranges of the one or more source storage volumes for which the token was created, a corresponding entry is generated in a given metadata delta log of the differential metadata.

7. The apparatus of claim 1 wherein controlling execution of the write-via-token command based at least in part on the determination comprises, responsive to the determination being affirmative, utilizing metadata from the one or more entries in the execution of the write-via-token command.

8. The apparatus of claim 1 wherein the differential metadata of the storage system comprises at least one metadata delta log comprising one or more delta log buffers each comprising one or more delta log records.

9. The apparatus of claim 8 wherein the one or more delta log buffers are configured as a tree structure comprising a first level based in part on snapshot group identifiers and a second level based in part on a hash of binary trees associated with respective ones of the snapshot group identifiers.

10. The apparatus of claim 1 wherein the storage system implements an in-memory transactional cache and generating the in-memory snapshot of data in the one or more logical address ranges of the one or more source storage volumes comprises generating the in-memory snapshot within the in-memory transactional cache.

11. The apparatus of claim 10 wherein input-output operations and storage system management operations are persisted in the in-memory transactional cache as part of a chronological journal.

12. The apparatus of claim 10 wherein responsive to the in-memory transactional cache reaching a designated fullness level, the in-memory snapshot is destaged from the in-memory transactional cache to one or more back-end storage devices of the storage system and designated for use only in conjunction with execution of one or more write-via-token commands.

13. The apparatus of claim 10 wherein responsive to the in-memory transactional cache reaching a designated fullness level, the in-memory snapshot is deleted and the token is invalidated.

14. A computer program product comprising a non-transitory processor-readable storage medium having stored therein program code of one or more software programs, wherein the program code when executed by at least one processing device causes the at least one processing device:
to receive a create-token command from a host device, the create-token command specifying one or more logical address ranges of one or more source storage volumes of a storage system;
responsive to receipt of the create-token command, to create a token, to generate an in-memory snapshot of data in the one or more logical address ranges of the one or more source storage volumes, to associate the in-memory snapshot with the token, and to provide the token to the host device;
to receive a write-via-token command from the host device, the write-via-token command specifying the token and one or more logical address ranges of one or more target storage volumes; and
responsive to receipt of the write-via-token command, to determine whether or not differential metadata of the storage system includes one or more entries for the one or more logical address ranges of the one or more source storage volumes, and to control execution of the write-via-token command based at least in part on the determination;
wherein determining if differential metadata of the storage system includes one or more entries for the one or more logical address ranges of the one or more source storage volumes comprises:
initiating an operation for copying of metadata for the one or more logical address ranges of the one or more source storage volumes from the in-memory snapshot to the one or more target storage volumes; and
determining in conjunction with the copying whether or not at least a portion of the metadata is in one or more metadata delta logs of the differential metadata; and
wherein controlling execution of the write-via-token command based at least in part on the determination comprises:
responsive to at least a portion of the metadata being in one or more metadata delta logs of the differential metadata, utilizing that portion of the metadata in the one or more metadata delta logs in the copying; and
copying remaining portions of the metadata from the in-memory snapshot to the one or more target storage volumes;
the controlling execution of the write-via-token command thereby being separated into at least first and second distinct parts, the first part utilizing the portion of the metadata in the one or more metadata delta logs, and the second part utilizing the remaining portions from the in-memory snapshot.

15. The computer program product of claim 14 wherein controlling execution of the write-via-token command based at least in part on the determination comprises, responsive to the determination being affirmative, utilizing metadata from the one or more entries in the execution of the write-via-token command.

16. The computer program product of claim 14 wherein the differential metadata of the storage system comprises at least one metadata delta log comprising one or more delta log buffers each comprising one or more delta log records.

17. A method comprising:
receiving a create-token command from a host device, the create-token command specifying one or more logical address ranges of one or more source storage volumes of a storage system;
responsive to receipt of the create-token command, creating a token, generating an in-memory snapshot of data in the one or more logical address ranges of the one or more source storage volumes, associating the in-memory snapshot with the token, and providing the token to the host device;
receiving a write-via-token command from the host device, the write-via-token command specifying the token and one or more logical address ranges of one or more target storage volumes; and
responsive to receipt of the write-via-token command, determining whether or not differential metadata of the storage system includes one or more entries for the one or more logical address ranges of the one or more source storage volumes, and controlling execution of the write-via-token command based at least in part on the determination;
wherein determining if differential metadata of the storage system includes one or more entries for the one or more logical address ranges of the one or more source storage volumes comprises:
initiating an operation for copying of metadata for the one or more logical address ranges of the one or more source storage volumes from the in-memory snapshot to the one or more target storage volumes; and
determining in conjunction with the copying whether or not at least a portion of the metadata is in one or more metadata delta logs of the differential metadata;
wherein controlling execution of the write-via-token command based at least in part on the determination comprises:
responsive to at least a portion of the metadata being in one or more metadata delta logs of the differential metadata, utilizing that portion of the metadata in the one or more metadata delta logs in the copying; and
copying remaining portions of the metadata from the in-memory snapshot to the one or more target storage volumes;
the controlling execution of the write-via-token command thereby being separated into at least first and second distinct parts, the first part utilizing the portion of the metadata in the one or more metadata delta logs, and the second part utilizing the remaining portions from the in-memory snapshot; and
wherein the method is performed by at least one processing device comprising a processor coupled to a memory.

18. The method of claim 17 wherein controlling execution of the write-via-token command based at least in part on the determination comprises, responsive to the determination being affirmative, utilizing metadata from the one or more entries in the execution of the write-via-token command.

19. The method of claim 17 wherein the differential metadata of the storage system comprises at least one metadata delta log comprising one or more delta log buffers each comprising one or more delta log records.

20. The method of claim 17 wherein the storage system implements an in-memory transactional cache and generating the in-memory snapshot of data in the one or more logical address ranges of the one or more source storage volumes comprises generating the in-memory snapshot within the in-memory transactional cache.

\* \* \* \* \*